(12) United States Patent
Nishikawa et al.

(10) Patent No.: US 10,996,457 B2
(45) Date of Patent: May 4, 2021

(54) WHEEL APPARATUS, LIGHT SOURCE APPARATUS, AND PROJECTION-TYPE IMAGE DISPLAY APPARATUS

(71) Applicant: Panasonic Intellectual Property Management Co., Ltd., Osaka (JP)

(72) Inventors: Yusaku Nishikawa, Osaka (JP); Yoshiki Tanaka, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/599,561

(22) Filed: Oct. 11, 2019

(65) Prior Publication Data
US 2020/0116993 A1   Apr. 16, 2020

(30) Foreign Application Priority Data

Oct. 12, 2018  (JP) .............................. JP2018-193432
Mar. 27, 2019  (JP) .............................. JP2019-061655

(51) Int. Cl.
*G03B 21/20* (2006.01)
*G02B 26/00* (2006.01)
*G03B 21/00* (2006.01)

(52) U.S. Cl.
CPC ......... *G02B 26/008* (2013.01); *G03B 21/008* (2013.01); *G03B 21/204* (2013.01); *G03B 21/2013* (2013.01)

(58) Field of Classification Search
CPC .... G03B 21/006; G03B 21/008; G03B 21/28; G03B 21/204; G03B 21/2013; G03B 21/2033; G03B 21/2053; G02B 26/00; G02B 26/007; G02B 26/008; G02B 26/0833; G02B 26/0875
See application file for complete search history.

(56) References Cited

U.S. PATENT DOCUMENTS

| | | | |
|---|---|---|---|
| 2006/0087625 A1 | 4/2006 | Liu | |
| 2010/0248494 A1 | 9/2010 | Barr et al. | |
| 2011/0116253 A1 | 5/2011 | Sugiyama | |
| 2012/0242912 A1 | 9/2012 | Kitano | |
| 2014/0211169 A1 | 7/2014 | Kitano et al. | |
| 2015/0296190 A1 | 10/2015 | Hirata et al. | |
| 2016/0091782 A1 | 3/2016 | Hashizume | |

(Continued)

FOREIGN PATENT DOCUMENTS

| | | |
|---|---|---|
| JP | 2006-119589 | 5/2006 |
| JP | 2008-20707 | 1/2008 |

(Continued)

*Primary Examiner* — Sultan Chowdhury
(74) *Attorney, Agent, or Firm* — Wenderoth, Lind & Ponack, L.L.P.

(57) ABSTRACT

A wheel apparatus includes a substrate rotatable around a rotation axis, and a plurality of optical elements respectively formed in a plurality of regions different from each other around the rotation axis on the substrate and having wavelength characteristics different from each other. The regions of the plurality of optical elements are adjacent to each other via boundary lines including linear sections. The linear sections of the boundary lines intersect with respective straight lines along the radius of the substrate at the same intersection angle greater than 0 degrees and less than 90 degrees.

17 Claims, 24 Drawing Sheets

(56) References Cited

U.S. PATENT DOCUMENTS

| | | | |
|---|---|---|---|
| 2017/0097560 A1 | 4/2017 | Matsubara et al. | |
| 2017/0237953 A1* | 8/2017 | Akiyama | H04N 9/3158 |
| | | | 353/31 |
| 2018/0081263 A1* | 3/2018 | Ogawa | G03B 21/204 |
| 2018/0259158 A1* | 9/2018 | Cui | H04N 9/3158 |
| 2019/0004409 A1* | 1/2019 | Nishikawa | G03B 21/2066 |
| 2019/0104287 A1* | 4/2019 | Hsu | G02B 27/0955 |

FOREIGN PATENT DOCUMENTS

| | | |
|---|---|---|
| JP | 2011-108502 | 6/2011 |
| JP | 2011-113779 | 6/2011 |
| JP | 2012-181394 | 9/2012 |
| JP | 2012-212129 | 11/2012 |
| JP | 2014-102364 | 6/2014 |
| JP | 2014-160227 | 9/2014 |
| JP | 2015-11302 | 1/2015 |
| JP | 2016-28454 | 2/2016 |
| JP | 2016-33553 | 3/2016 |
| JP | 2016-71128 | 5/2016 |
| JP | 2016-109811 | 6/2016 |
| WO | 2015/151171 | 10/2015 |

* cited by examiner

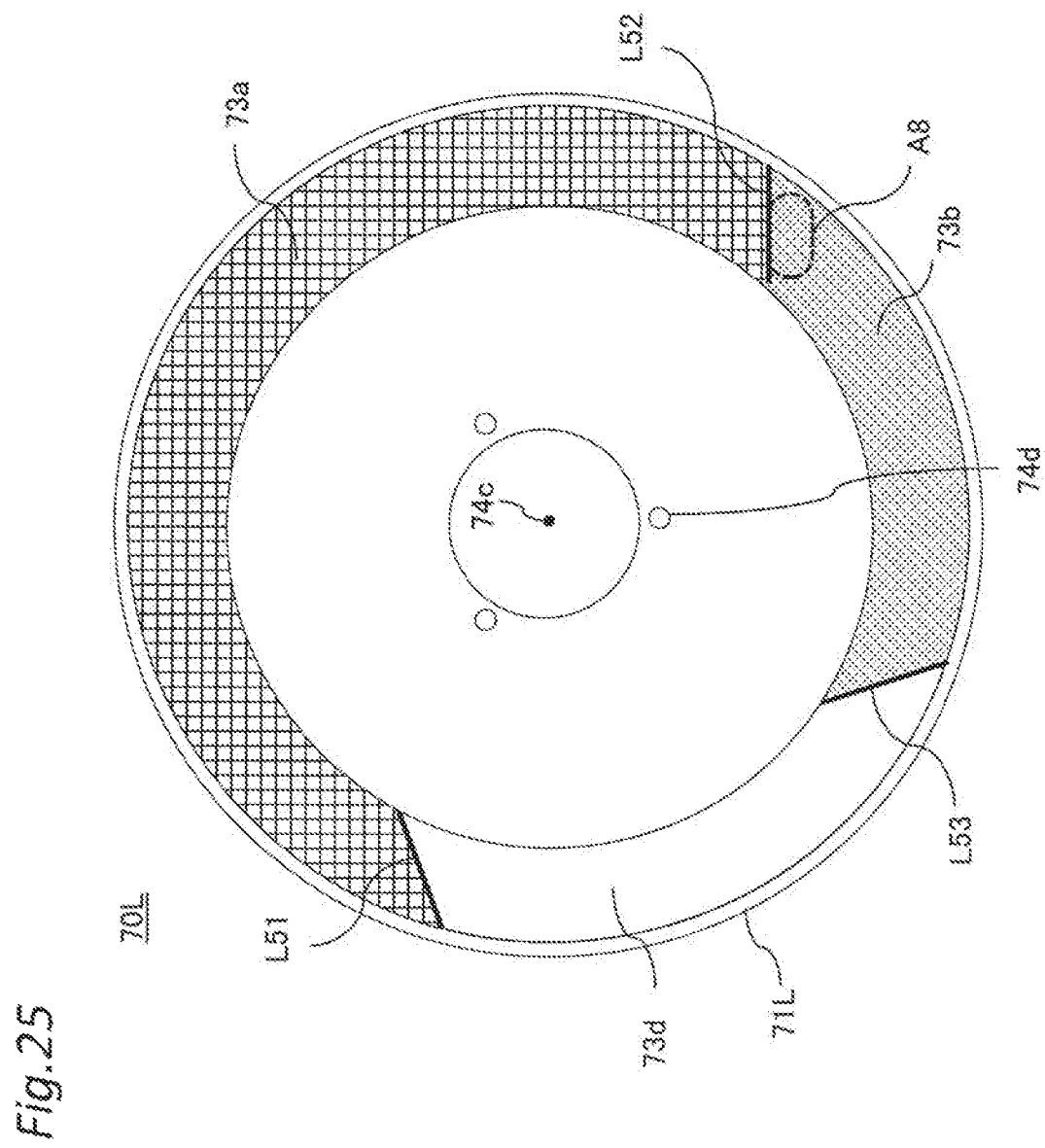

WHEEL APPARATUS, LIGHT SOURCE APPARATUS, AND PROJECTION-TYPE IMAGE DISPLAY APPARATUS

BACKGROUND

1. Technical Field

The present disclosure relates to a wheel apparatus including an optical element such as a phosphor or a color filter used in a light source apparatus of a projection-type image display apparatus, for example, and a light source apparatus and a projection-type image display apparatus including such a wheel apparatus.

2. Related Art

A high-pressure mercury lamp with high luminance has been conventionally used as a light source for a projection-type image display apparatus (projector). The high-pressure mercury lamp has problems that the lamp cannot instantaneously be turned on and that frequent maintenance is required because of a short life as a light source. On the other hand, due to recent developments in technology related to solid-state light emitting elements (e.g., semiconductor laser elements and light emitting diodes), it has been proposed to use a solid-state light emitting element as a light source element for a projection-type image display apparatus as disclosed in Patent Documents 1 and 2, for example.

The projection-type image display apparatus may include, for example, a light source element generating light (referred to as "source light") in only one color and a phosphor wheel including phosphors. In this case, the projection-type image display apparatus generates a source light having a predetermined color component (e.g., blue light) by the light source element, and makes this source light incident on the phosphor wheel, thereby generating fluorescence including other color components (e.g., red light and green light). Subsequently, the projection-type image display apparatus filters the fluorescence to extract the color components (red light and green light) and thereby obtains an illumination light having desired color components such as red light, green light, and blue light.

The projection-type image display apparatus makes the illumination light incident on an optical modulation element such as a DMD (digital mirror device). The optical modulation element spatially modulates the illumination light in accordance with an input image signal to generate an image light. Finally, the projection-type image display apparatus projects the image light on a screen.

Patent Document 1: JP 2014-160227 A
Patent Document 2: JP 2016-033553 A

The projection-type image display apparatus described above etc. may employ a wheel apparatus including a plurality of optical elements formed on a rotatable substrate and having wavelength characteristics different from each other. The plurality of optical elements may be a plurality of phosphors generating outgoing lights having wavelength characteristics different from each other in accordance with a certain incident light or may be a plurality of color filters filtering fluorescence or any incident light. When the light is incident near a boundary (also referred to as "spoke") between adjacent optical elements, a transmitted light of one optical element and a transmitted light of the other optical element are generated at the same time, and therefore, the transmitted lights of respective different color components are mixed. Since the optical modulation element modulates an illumination light having one predetermined color component, the light including a plurality of mixed color components cannot be used as an illumination light made incident on the optical modulation element.

In this way, a portion of the light transmitted through the wheel apparatus cannot be used as a light having a single-color component and is wasted (herein also referred to as "spoke loss"), so that the luminance of the image light is consequently reduced. Therefore, to improve the luminance of the image light, it is required to reduce the influence of the spoke loss as compared to the conventional techniques.

SUMMARY

An objective of the present disclosure is to provide a wheel apparatus capable of reducing an influence of a spoke loss as compared to the conventional techniques. Another object of the present disclosure is to provide a light source apparatus and a projection-type image display apparatus including such a wheel apparatus.

A wheel apparatus according to an aspect of the present disclosure includes a substrate rotatable around a rotation axis, and a plurality of optical elements respectively formed in a plurality of regions different from each other around the rotation axis on the substrate and having wavelength characteristics different from each other. The regions of the plurality of optical elements are adjacent to each other via boundary lines including linear sections. The linear sections of the boundary lines intersect with respective straight lines along the radius of the substrate at the same intersection angle greater than 0 degrees and less than 90 degrees.

The wheel apparatus according to the present disclosure can reduce an influence of a spoke loss as compared to the conventional techniques.

BRIEF DESCRIPTION OF THE DRAWINGS

FIG. 25 is a plan view showing the configuration of the wheel apparatus 70L of FIG. 23.

DESCRIPTION OF THE PREFERRED EMBODIMENTS

Figure 1:
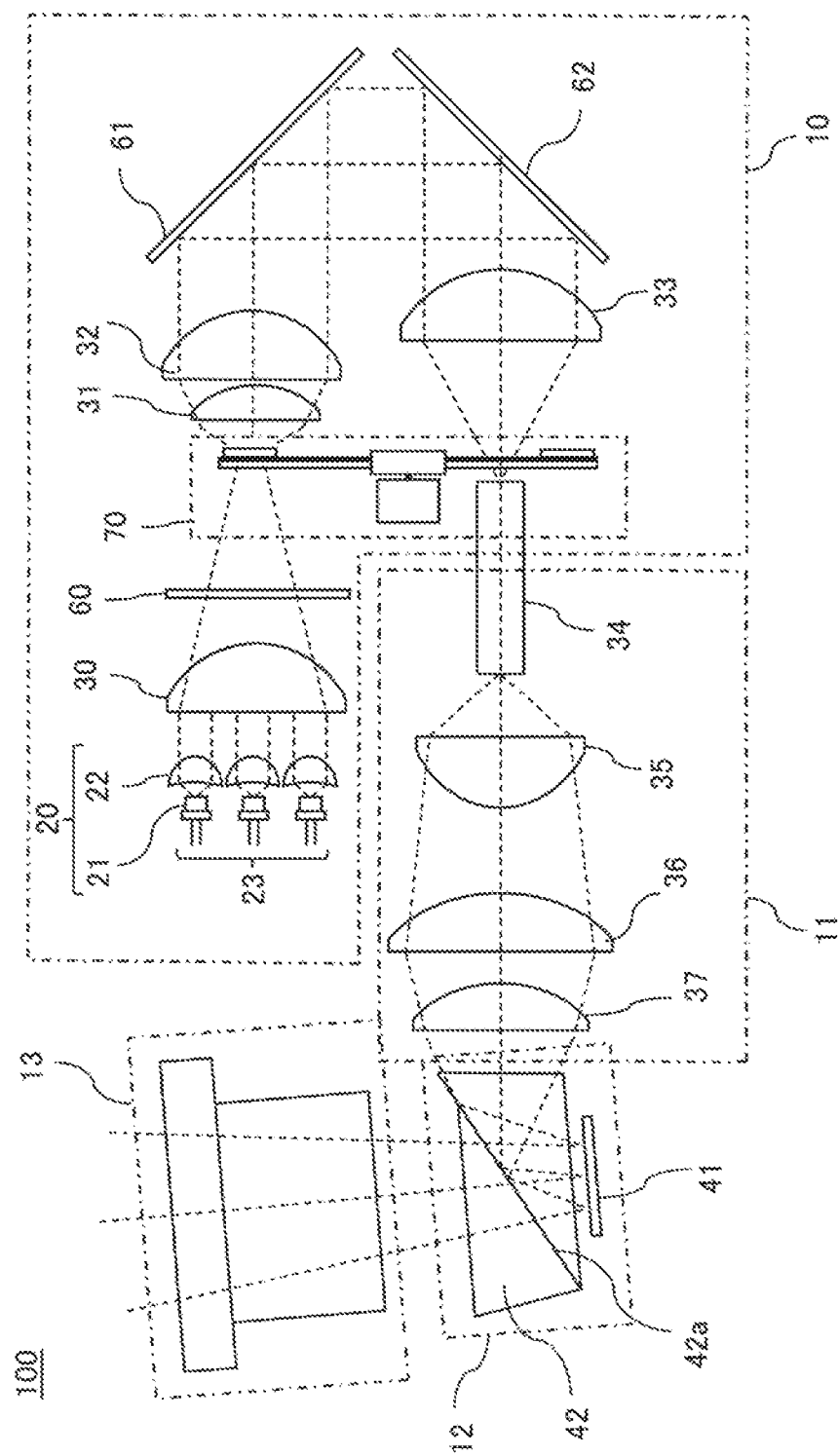
FIG. 1 is a schematic diagram showing a configuration of a projection-type image display apparatus 100 according to a first embodiment.

Embodiments will now be described in detail with reference to the drawings as needed. It is noted that detailed description will not be provided more than necessary in some cases. For example, detailed description of already well-known facts and repeated description of substantially the same constituent elements may not be provided. This is for the purpose of avoiding unnecessary redundancy of the following description and facilitating understanding by those skilled in the art. The accompanying drawings and the following description are provided for sufficient understanding of the present disclosure by those skilled in the art, and it is not intended to limit the subject matter described in claims thereto.

In the following description of the drawings of a wheel apparatus, a light source apparatus, and a projection-type image display apparatus according to the embodiments of the present disclosure, the same or similar portions are denoted by the same or similar reference numerals. However, it should be noted that the drawings are schematic and that ratios of dimensions etc. are different from actual ratios. Therefore, specific dimensions etc. should be determined in consideration of the following description. Additionally, portions different in dimensional relationships or ratios may be included between the drawings.

First Embodiment

A projection-type image display apparatus according to a first embodiment will hereinafter be described with reference to FIGS. 1 to 9.

(Overview of Projection-Type Image Display Apparatus 100)

FIG. 1 is a schematic diagram showing a configuration of a projection-type image display apparatus 100 according to the first embodiment. FIG. 1 particularly shows an optical configuration of the projection-type image display apparatus 100. The projection-type image display apparatus 100 includes a light source apparatus 10, an illumination optical system 11, a modulation device 12, and a projection optical system 13.

The light source apparatus 10 mainly includes a light source 20 generating a source light having a predetermined wavelength, and a wheel apparatus 70 generating a fluorescence excited by the source light. As described later, the wheel apparatus 70 is provided with a phosphor as well as a dichroic filter extracting color components of the fluorescence. Therefore, the light source apparatus 10 generates an illumination light having desired color components such as yellow light, red light, green light, and blue light.

The illumination optical system 11 sends the illumination light generated by the light source apparatus 10 to the modulation device 12.

The modulation device 12 mainly includes one optical modulation element 41 spatially modulating the illumination light in accordance with an input image signal to generate an image light.

The projection optical system 13 enlarges and projects the image light onto a screen (not shown) outside the projection-type image display apparatus 100.

(Configuration of Light Source Apparatus 10)

The light source apparatus 10 includes the light source 20, a condenser lens 30, a diffusion plate 60, the wheel apparatus 70, lenses 31 and 32, mirrors 61 and 62, and a lens 33.

The light source 20 includes a plurality of light source elements 21 and a plurality of collimator lenses 22 respectively condensing the source lights emitted from the light source elements 21 into substantially parallel lights. In an exemplary embodiment, the light source 20 includes a plurality of the light source elements 21 arranged as a rectangular array 23 having long and short sides different in length from each other so as to generate a high-luminance illumination light. Each of the light source elements 21 is a semiconductor laser element, for example. In an exemplary embodiment, each of the light source elements 21 is a semiconductor laser element generating blue laser light (e.g., with a wavelength of 455 nm) having a highest light emission efficiency among the three primary colors of RGB. The semiconductor laser element is an example of a solid-state light emitting element. To cool the light source elements 21, the light source 20 also includes a heat sink (not shown) in contact with the light source elements 21, for example, and forcibly cools the light source elements 21 with air.

The source lights emitted from the light source 20 are condensed by the condenser lens 30 and thereby superimposed with each other and made incident on the diffusion plate 60. The diffuser plate 60 reduces the coherence of the source light generated by the light source 20. The source light transmitted through the diffusion plate 60 is made incident on the wheel apparatus 70.

The wheel apparatus 70 includes phosphors excited by the incident source light to generate a fluorescence having a wavelength different from the wavelength of the source light. The wheel apparatus 70 further includes a diffusion film formed in a region different from the region of the phosphors and diffusing the incident source light. The wheel apparatus 70 further includes dichroic filters transmitting the incident fluorescence and reflecting the incident source light. The wheel apparatus 70 further includes a transmission window formed in a region different from the dichroic filters and transmitting the incident source light. Details of the wheel apparatus 70 will be described later.

The fluorescence emitted from the phosphors of the wheel apparatus 70 is made almost parallel by a collimator lens group including the lenses 31 and 32, reflected by the mirrors 61 and 62, condensed by the lens 33, and made incident on the dichroic filters of the wheel apparatus 70. Color components of the fluorescence incident on the dichroic filters are extracted through the dichroic filters. Similarly, the source light emitted from the diffusion film of the wheel apparatus 70 is made almost parallel by the lenses 31 and 32, reflected by the mirrors 61 and 62, condensed by the lens 33, and transmitted through the transmission window of the wheel apparatus 70. Lights of the color components transmitted through the dichroic filters (e.g., yellow light, red light, and green light) and the source light transmitted through the transmission window (i.e., blue light) serve as an illumination light generated by the light source apparatus 10 and proceed to the illumination optical system 11. As described later, the light source apparatus 10 generates the lights of the color components (yellow light, red light, green light, and blue light) of the illumination light by time division.

A portion of the source light incident on the phosphors of the wheel apparatus 70 from the light source 20 passes through the phosphors without being converted into fluorescence and is made incident on the dichroic filters of the wheel apparatus 70 via the lenses 31, 32, the mirrors 61, 62, and the lens 33. This source light is reflected by the dichroic filters and is made incident on the phosphors of the wheel apparatus 70 again via the lens 33, the mirrors 62, 61, and the lenses 32, 31.

(Configuration of Illumination Optical System 11)

The illumination optical system 11 includes a rod integrator 34, a lens 35, a lens 36, and a lens 37. The illumination light generated by the light source apparatus 10 is made incident on the rod integrator 34. The rod integrator 34 uniformizes the intensity distribution of the illumination light emitted from the light source apparatus 10. The rod integrator 34 may be a solid rod made up of a transparent member of glass etc. or may be a hollow rod having an inner wall formed as a mirror surface. The rod integrator 34 has a quadrilateral, for example, rectangular cross-sectional shape. The illumination light emitted from the rod integrator 34 is sent to the modulation device 12 via the lens 35, the lens 36, and the lens 37.

(Configuration of Modulation Device 12)

The modulation device 12 includes an optical modulation element 41 and a prism 42. The optical modulation element 41 has a quadrilateral modulation region in which microelements corresponding to pixels of an image are arranged. The optical modulation element 41 is a DMD (digital mirror device) having a plurality of movable micromirrors, for example. The prism 42 includes a dichroic mirror 42a. The dichroic mirror 42a totally reflects the illumination light made incident from the illumination optical system 11 and guides the light to the optical modulation element 41. The optical modulation element 41 is controlled by a control circuit (not shown) of the projection-type image display appartus 100 in accordance with the image signal and in accordance with which color component of the illumination light is input, and modulates the lights of the color components of the illumination light by time division. The lights of the color components of the image light generated by modulating the illumination light by the optical modulation element 41 are transmitted through the prism 42 and sent to the projection optical system 13.

(Configuration of Projection Optical System 13)

The projection optical system 13 includes one or more projection lenses and magnifies and projects the image light onto the screen (not shown) outside the projection-type image display apparatus 100.

(Wheel Apparatus 70)

Figure 2:
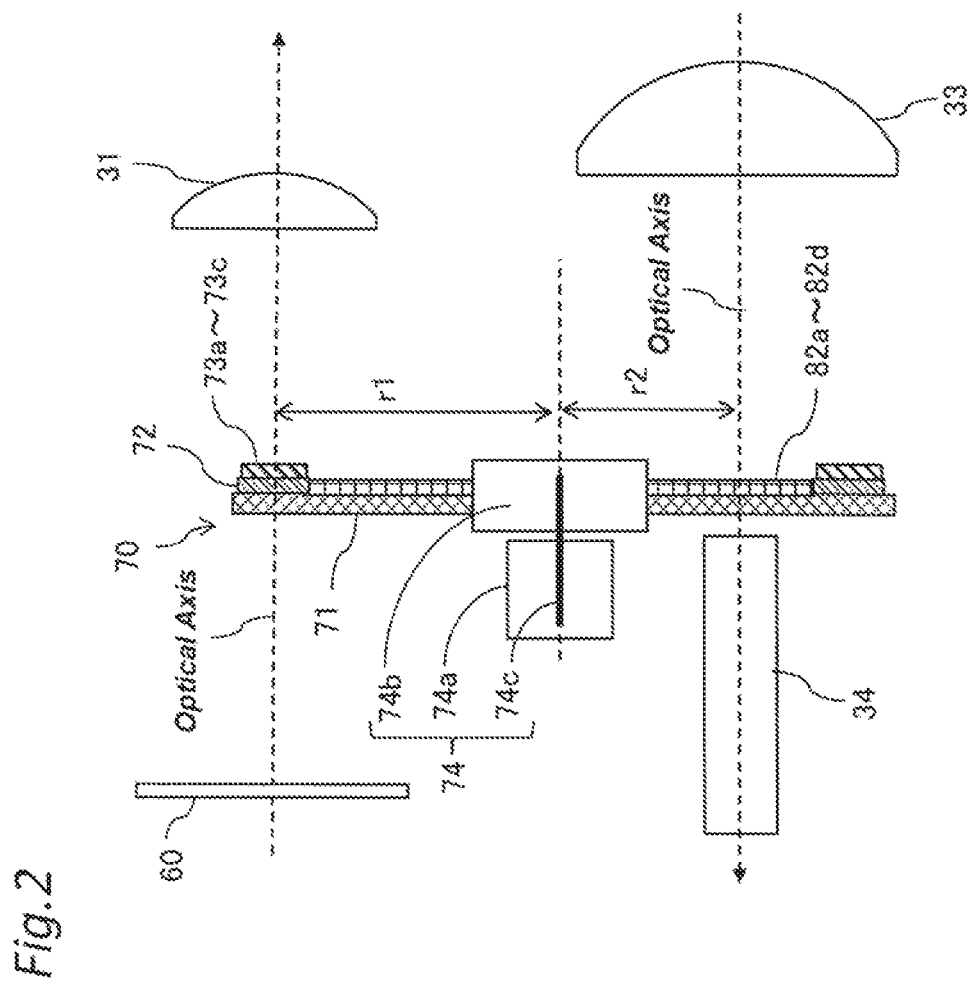
FIG. 2 is a side view showing a configuration of a wheel apparatus 70 of FIG. 1.
Figure 3:
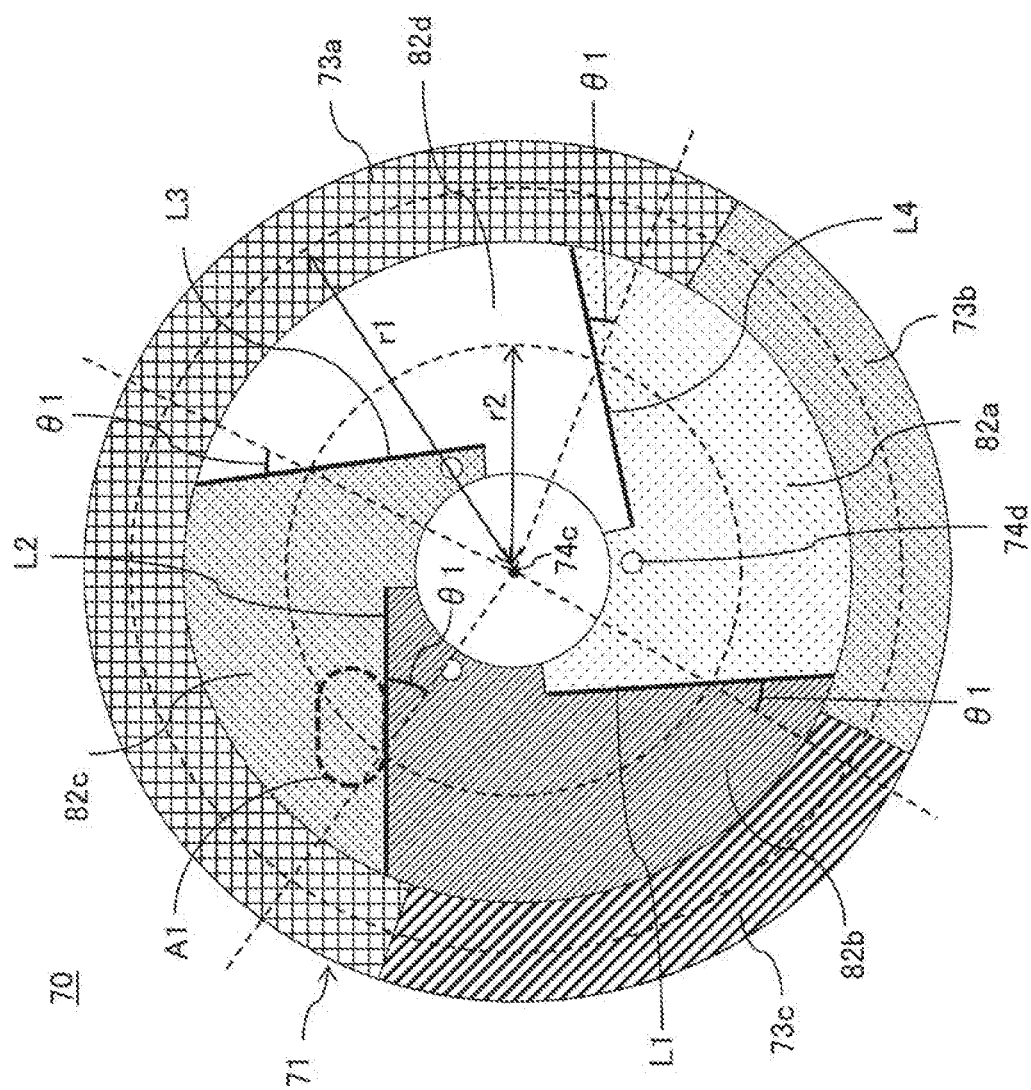
FIG. 3 is a plan view showing the configuration of the wheel apparatus 70 of FIG. 1.

A configuration of the wheel apparatus 70 will be described with reference to FIGS. 2 and 3. FIG. 2 is a side view showing the configuration of the wheel apparatus 70 of FIG. 1. FIG. 3 is a plan view showing the configuration of the wheel apparatus 70 of FIG. 1. FIG. 2 shows a cross-sectional view when the wheel apparatus 70 is viewed in the same direction as FIG. 1. FIG. 3 shows a plan view when the wheel apparatus 70 is viewed from the right side of FIG. 2.

The wheel apparatus 70 includes a substrate 71, a dichroic filter 72, phosphors 73a and 73b, a diffusion film 73c, a driving device 74, dichroic filters 82a to 82c, and a transmission window 82d.

The substrate 71 is made of a transparent material and can rotate around a rotation axis 74c (described later). The substrate 71 has a disk shape, for example. The substrate 71 is a sapphire substrate having a high thermal conductivity, for example.

The dichroic filter 72 is formed in a region along a circumference having a radius r1 from the rotation axis 74c on the substrate 71. The dichroic filter 72 transmits an incident light having a wavelength of a source light and reflects an incident light having a wavelength different from the wavelength of the source light. For example, the dichroic filter 72 transmits an incident light in a visible range having a wavelength of 480 nm or less and reflects an incident light in a visible range having a wavelength longer than 480 nm. As a result, the dichroic filter 72 transmits the source light made incident from the light source 20 and reflects the fluorescence generated by exciting the phosphors 73a and 73b with the source light.

The wheel apparatus 70 includes at least one first optical element formed on a first circumference having a first radius r1 from the rotation axis 74c on the substrate 71. The first optical element includes at least one phosphor. In the example of FIGS. 2 and 3, the first optical element is a combination of the phosphors 73a and 73b and the diffusion film 73c that is an element generating an outgoing light having the same wavelength characteristic as the wavelength characteristic of the incident light.

The phosphors 73a and 73b are formed in respective regions having predetermined angular widths as viewed from the rotation axis 74c in the region along the circumference having the radius r1 from the rotation axis 74c on the substrate 71. The phosphors 73a and 73b are excited by the incident light having the wavelength of the source light and each generate a fluorescence having a wavelength different from the wavelength of the source light.

The diffusion film 73c is formed in a region different from the regions of the phosphors 73a and 73b in the region along the circumference having the radius r1 from the rotation axis 74c on the substrate 71 and contains a diffusion material diffusing the incident light.

As shown in FIG. 1, the wheel apparatus 70 is disposed in a stage subsequent to the diffusion plate 60, and the lens 31 is disposed in a stage subsequent to the wheel apparatus 70, so that an outgoing light of the phosphors 73a, 73b and the diffusion film 73c is made incident on the lens 31. As shown in FIGS. 2 and 3, the optical axis of this light passes through the circumference having the radius r1 from the rotation axis 74c in the wheel apparatus 70. The regions of the phosphors 73a, 73b and the diffusion film 73c are formed to include respective different arc portions of the circumference having the radius r1 from the rotation axis 74c.

The fluorescence itself generated by the phosphors is spatially diffused (i.e., emitted radially from the phosphors). Therefore, among the color components of the illumination light, the lights of the color components extracted from the fluorescence (e.g., yellow light, red light, and green light; referred to as "fluorescence component light") are also spatially diffused and have a uniform intensity distribution. On the other hand, the source light generated by the solid-state light emitting element has a thin light beam. Therefore, among the color components of the illumination light, a light of a color component other than those extracted from the fluorescence (e.g., blue light; referred to as "non-fluorescent componence light") may have a spatially non-uniform intensity distribution concentrated in a certain region. If the light of any color component of the illumination light has a spatially non-uniform intensity distribution, the image light becomes uneven. Therefore, the diffusion plate 60 is disposed in the stage preceding the wheel apparatus 70, and the diffusion film 73c is disposed on the wheel apparatus 70, so as to make the spatial intensity distribution of the non-fluorescence component light uniform in conformity with the spatial intensity distribution of the fluorescence component light. As a result, the unevenness of the image light can be reduced.

The phosphors 73a, 73b and the diffusion film 73c are formed on the dichroic filter 72 as shown in FIG. 2, for example. The phosphors 73a, 73b and the diffusion film 73c may be formed on the same side as the dichroic filter 72 as shown in FIGS. 2 and 3, or may be formed on the opposite side, on the substrate 71.

The wheel apparatus 70 includes a plurality of second optical elements that are respectively formed in a plurality of different regions along a second circumference having a second radius r2 different from the first radius r1 from the rotation axis 74c on the substrate 71 and that have wavelength characteristics different from each other. The plurality of the second optical elements is a plurality of color filters, or a combination of at least one color filter and an element generating an outgoing light having the same wavelength characteristic as the wavelength characteristic of the incident light. In the example of FIGS. 2 and 3, the plurality of the second optical elements is a combination of the dichroic filters 82a to 82c that are a plurality of color filters and the transmission window 82d that is an element generating an outgoing light having the same wavelength characteristic as the wavelength characteristic of the incident light.

The dichroic filters 82a to 82c are a plurality of different regions along the circumference having the radius r2 smaller than the radius r1 from the rotation axis 74c on the substrate 71 and are formed in regions each having a predetermined angular width as viewed from the rotation axis 74c. The dichroic filters 82a to 82c have respective wavelength characteristics different from each other, transmit the incident light having a wavelength of light of a predetermined color component of fluorescence, and reflect the incident light having the wavelength of the source light. The wavelength characteristics of the dichroic filters 82a to 82c as described above are called wavelength-selective characteristics since a wavelength of light is selectively transmitted or reflected. As a result, the dichroic filters 82a to 82c transmit the lights of the predetermined color components of the fluorescence generated by the phosphors 73a and 73b and reflect the source light made incident on the phosphors 73a and 73b of the wheel apparatus 70 from the light source 20 and passing through the phosphors 73a and 73b without being converted into the fluorescence.

The transmission window 82d is formed in a region different from the dichroic filters 82a to 82c in the region along the circumference having the radius r2 in the substrate 71 and transmits the incident light.

As shown in FIG. 1, the wheel apparatus 70 is disposed in a stage subsequent to the lens 33, and the rod integrator 34 is disposed in a stage subsequent to the wheel apparatus 70, so that the outgoing light of the dichroic filters 82a to 82c and the transmission window 82d is made incident on the rod integrator 34. As shown in FIGS. 2 and 3, the optical axis of this light passes through the circumference having the radius r2 from the rotation axis 74c in the wheel apparatus 70. The regions of the dichroic filters 82a to 82c and the transmission window 82d are formed to include respective different arc portions of the circumference having the radius r2 from the rotation axis 74c. The regions of the dichroic filters 82a to 82c and the transmission window 82d are adjacent to each other via boundary lines including linear sections L1 to L4. The linear sections L1 to L4 of the boundary lines intersect with respective straight lines along the radius of the substrate 71 at the same intersection angle θ1 greater than 0 degrees and less than 90 degrees.

The light incident on the dichroic filters 82a to 82c and the transmission window 82d from the optical system (the lenses 31 to 33 and the mirrors 61, 62) of the stage preceding the wheel apparatus 70 forms a spot region A1 as shown in FIG. 3.

The driving device 74 rotates the substrate 71 around the rotation axis 74c under the control of the control circuit (not shown) of the projection-type image display apparatus 100. The driving device 74 includes a motor 74a, an attachment tool 74b, and the rotation axis 74c. The substrate 71 is attached to the motor 74a via the attachment tool 74b. For example, the attachment tool 74b sandwiches the substrate 71 with a hub and a holding member and fixes the substrate 71 with screws through screw holes 74d of the substrate 71.

(Phosphors 73a, 73b and Diffusion Film 73c)

The phosphor 73a is applied to the region having the predetermined angular width as viewed from the rotation axis 74c and is excited by a blue light having a wavelength of about 455 nm to generate a yellow fluorescence including a yellow light having a dominant wavelength of about 570 nm, for example. The phosphor 73b is a region different from the region of the phosphor 73a, is applied to the region having the predetermined angular width as viewed from the rotation axis 74c, and is excited by a blue light having a wavelength of about 455 nm to generated a green fluorescence including a green light having a dominant wavelength of 550 nm, for example. The phosphor 73a is made of a mixture of a yellow phosphor generating the yellow fluorescence and a binder. The phosphor 73b is made of a mixture of a green phosphor generating the green fluorescence and a binder. The yellow phosphor is $Y_3Al_5O_{12}:Ce^{3+}$, for example. The green phosphor is $Lu_3Al_5O_{12}:Ce^{3+}$, for example. The binder is made of a transparent material, for example, a silicone resin. The thicknesses and concentrations of the phosphors 73a and 73b are adjusted to transmit a desired proportion of light out of the incident source light.

In the diffusion film 73c, a mixture of a binder made of a transparent material having a predetermined refractive index and a diffusion material having a refractive index different from the refractive index of the binder is applied to a region having a predetermined angular width as viewed from the rotation axis 74c. The binder is made of a silicone resin, for example. The diffusion material is glass beads, for example. The thickness of the diffusion film 73c and the refractive index and the concentration of the diffusion material are adjusted to diffuse the incident source light at a desired angle.

The source light generated by the light source 20 is made incident on the wheel apparatus 70 from a surface on the left side of FIG. 2 and incident on the phosphors 73a, 73b and the diffusion film 73c. The driving device 74 rotates the substrate 71 once in a time corresponding to one frame of the image (e.g., 1/60 second). Therefore, the source light made incident on the wheel apparatus 70 from the light source 210 is made incident on the phosphor 73a, the phosphor 73b, and the diffusion film 73c in order in a time corresponding to one frame.

The phosphor 73a is excited by incident source light and isotropically generates the yellow fluorescence. The phosphor 73b is excited by the incident source light and isotropically generates the green fluorescence. In the yellow fluorescence and the green fluorescence generated by the phosphors, a portion generated in the leftward direction of FIG. 2 (the direction opposite to the traveling direction of the source light incident on the wheel apparatus 70 from the light source 20 (rightward direction)) is reflected by the dichroic filter 72. Therefore, the fluorescence generated in the leftward direction of FIG. 2 is emitted from a surface on the right side of the wheel apparatus 70 together with the fluorescence generated in the rightward direction of FIG. 2. The source light incident on the diffusion film 73c is diffused by the diffusion material and is emitted from the surface on the right side of the wheel apparatus 70.

The yellow fluorescence, the green fluorescence, and the diffused source light generated as describe above are made incident on the dichroic filters 82a to 82c and the transmission window 82d of the wheel apparatus 70 through the optical system including the lenses 31 and 32, the mirrors 61 and 62, and the lens 33.

(Dichroic Filters 82a to 82c and Transmission Window 82d)

The dichroic filters 82a to 82c and the transmission window 82 are each formed around the rotation axis 74c, for example, as shown in FIG. 3. For example, the dichroic filters 82a and 82c transmit an incident light in a visible range having a wavelength longer than 480 nm and reflect an incident light in a visible range having a wavelength of 480 nm or less. For example, the dichroic filter 82b transmits an incident light in a visible range having a wavelength longer than 600 nm and reflects an incident light in a visible range having a wavelength of 600 nm or less. The transmission window 82d transmits the source light diffused by the diffusion film 73c. The transmission window 82d is formed in the substrate 71 made of a transparent material, as a region where the substrate 71 itself is exposed without forming a dichroic filter, for example. The transmission window 82d may have an antireflection film formed on the substrate 71.

The wheel apparatus 70 and the optical system including the lenses 31 and 32, the mirrors 61 and 62, and the lens 33 are configured such that the yellow fluorescence generated by the phosphor 73a is made incident on the dichroic filters 82a and 82b. Similarly, the wheel apparatus 70 and the associated optical system are configured such that the green fluorescence generated by the phosphor 73b is made incident on the dichroic filter 82c. Similarly, the wheel apparatus 70 and the associated optical system are configured such that the source light diffused by the diffusion material of the diffusion film 73c is made incident on the transmission window 82d. Therefore, the sum of the angular widths of the dichroic filters 82a and 82b is set equal to the angular width of the region of the phosphor 73a. The angular width of the dichroic filter 82c is set equal to the angular width of the region of the phosphor 73b. The angular width of the transmission window 82d is set equal to the angular width of the region of the diffusion film 73c.

When the yellow fluorescence from the phosphor 73a is made incident on the dichroic filter 82a, the dichroic filter 82a transmits the light having a wavelength longer than 480 nm and reflects the light having a wavelength of 480 nm or less, so that the light source apparatus 10 emits the yellow light as the illumination light. On the other hand, when the yellow fluorescence from the phosphor 73a is made incident on the dichroic filter 82b, the dichroic filter 82b transmits the light having a wavelength longer than 600 nm and reflects the light having a wavelength of 600 nm or less, so that the light source apparatus 10 emits the red light as the illumination light. When the green fluorescence from the phosphor 73b is made incident on the dichroic filter 82c, the dichroic filter 82c transmits the light having a wavelength longer than 480 nm and reflects the light having a wavelength of 480 nm or less, so that the light source apparatus 10 emits the green light as the illumination light. When the diffused source light (blue light) from the diffusion film 73c is made incident on the transmission window 82d, the transmission window 82d transmits the blue light, and the light source apparatus 10 emits the blue light as the illumination light.

(Reduction of Spoke Loss)

When the yellow fluorescence, the green fluorescence, and the diffused source light are made incident on the vicinities of the boundary lines (spokes) of the regions of the dichroic filters 82a to 82c and the transmission window 82d, the transmitted lights of the respective different color components are mixed so that a spoke loss occurs as described above. A reduction of the spoke loss by the wheel apparatus 70 according to this embodiment will be described.

As described above, when the plurality of the light source elements 21 is arranged as the rectangular array 23 having long and short sides different in length, the spot region A1 also has a rectangular shape, or a rectangular shape with rounded corners. To reduce the influence of the spoke loss, the regions of the dichroic filters 82a to 82c and the transmission window 82d are formed such that the time of the spokes passing over the spot region A1 is reduced or minimized when the substrate 71 rotates. Therefore, the wheel apparatus 70 is disposed relative to the optical system of the stage preceding the wheel apparatus 70 such that when the surface of the wheel apparatus 70 at a predetermined rotational position is viewed along the optical axis, the spot region A1 overlaps with one of the multiple linear sections L1 to L4 and this linear section becomes parallel to a longitudinal direction of the spot region A1. The example of FIG. 3 shows the case that the linear section L2 is parallel to the longitudinal direction of the spot region A1 when an edge of the spot region A1 overlaps with the linear section L2. By arranging the wheel apparatus 70 and the optical system of the preceding stage in this way, the influence of the spoke loss can be reduced or minimized.

The wheel apparatus 70 may be disposed relative to the optical system of the stage preceding the wheel apparatus 70 such that when the spot region A1 overlaps with one of the multiple linear sections L1 to L4 at another position (e.g., the center), this linear section becomes parallel to the longitudinal direction of the spot region A1.

The spot region A1 is not limited to a rectangular shape, or a rectangular shape with rounded corners, and may have other shapes such as an ellipse as long as the region has longitudinal and lateral lengths different from each other (i.e., has a longitudinal direction).

As described above, the linear sections L1 to L4 of the boundary lines intersect with the respective straight lines along the radius of the substrate 71 at the same intersection angle θ1. Therefore, the influence of the spoke loss can be reduced or minimized when the spot region A1 passes over any boundary line among the boundary lines of the regions of the dichroic filters 82a to 82c and the transmission window 82d.

(Effects of First Embodiment)

According to the wheel apparatus 70 according to this embodiment, by forming the boundary lines of the regions of the dichroic filters 82a to 82c and the transmission window 82d and arranging the wheel apparatus 70 and the optical system of the preceding stage as shown in FIGS. 2 and 3, the influence of the spoke loss can be reduced or minimized. As a result, the light source apparatus 10 and the projection-type image display apparatus 100 including the wheel apparatus 70 according to this embodiment can improve the luminance of the image light as compared to the conventional techniques.

When the projection-type image display apparatus 100 is limited in terms of dimension of a housing, the arrangement of the wheel apparatus 70 and the optical system of the preceding stage may be restricted. Even in such a case, the influence of the spoke loss can be reduced or minimized by appropriately forming the boundary lines of the regions of the dichroic filters 82a to 82c and the transmission window 82d. This improves a degree of freedom of arrangement of the wheel apparatus 70 and the optical system of the preceding stage, so that the small projection-type image display apparatus 100 can be achieved.

(First Modification of First Embodiment)

Figure 4:
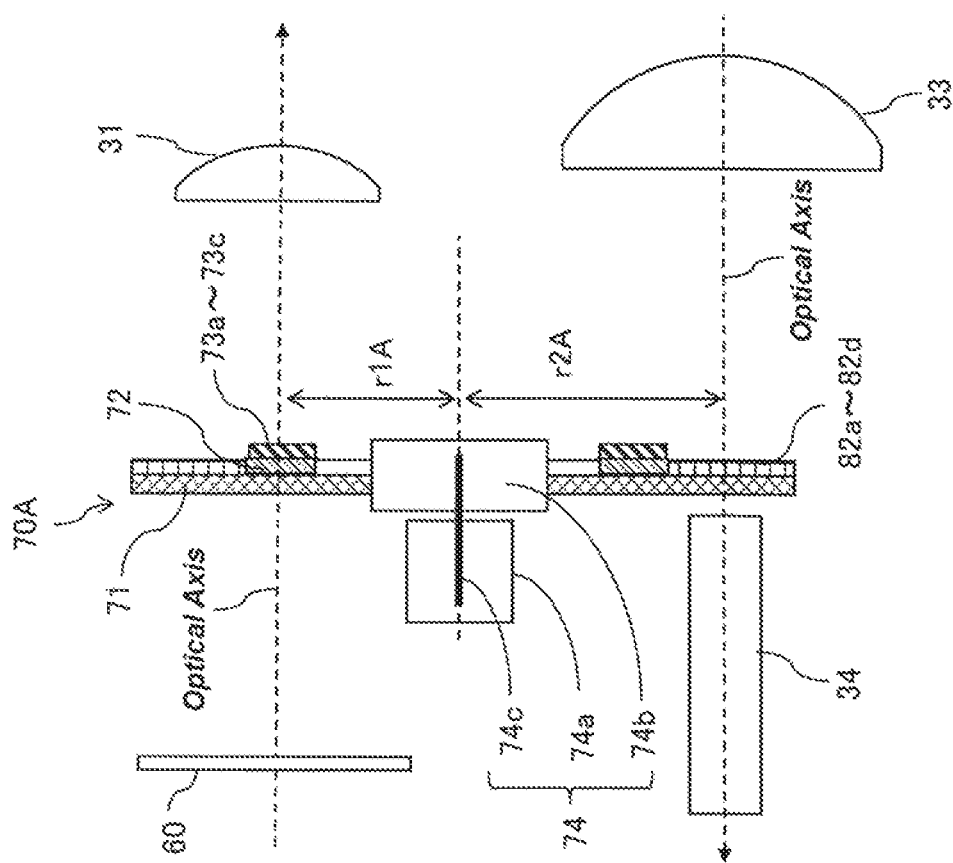
FIG. 4 is a side view showing a configuration of a wheel apparatus 70A according to a first modification of the first embodiment.
Figure 5:
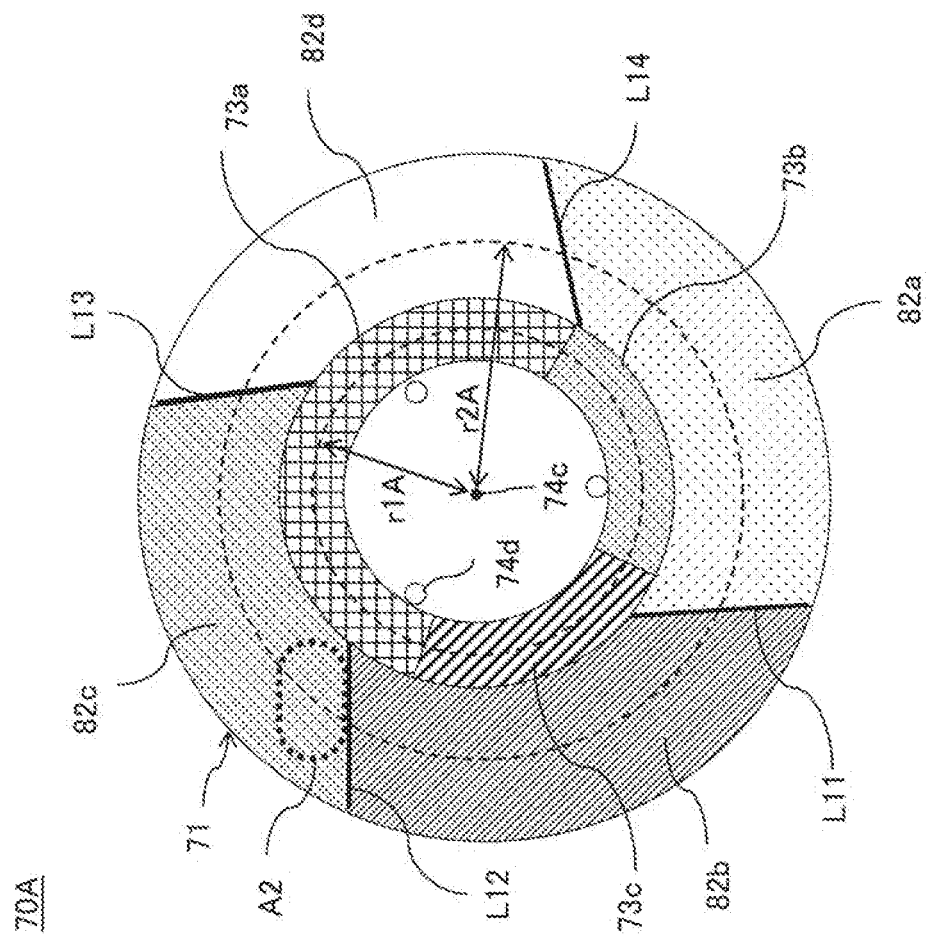
FIG. 5 is a plan view showing the configuration of the wheel apparatus 70A of FIG. 4.

FIG. 4 is a side view showing a configuration of a wheel apparatus 70A according to a first modification of the first embodiment. FIG. 5 is a plan view showing the configuration of the wheel apparatus 70A of FIG. 4. In the example of FIGS. 2 and 3, the dichroic filters 82a to 82c and the transmission window 82d are formed inside the dichroic filter 72, the phosphors 73a, 73b, and the diffusion film 73c on the substrate 71. Alternatively, as shown in FIGS. 4 and 5, the dichroic filters 82a to 82c and the transmission window 82d may be formed outside the dichroic filter 72, the phosphors 73a, 73b, and the diffusion film 73c on the substrate 71. In the example of FIGS. 4 and 5, the dichroic filter 72, the phosphors 73a, 73b, and the diffusion film 73c are formed in a region along a circumference having a radius r1A from the rotation axis 74c on the substrate 71. The dichroic filters 82a to 82c and the transmission window 82d are formed in a region along a circumference having a radius r2A larger than the radius r1A from the rotation axis 74c on the substrate 71. The optical axis of the light passing through the dichroic filters 82a to 82c and the transmission window 82d and made incident on the rod integrator 34 passes through the circumference having the radius r2A from the rotation axis 74c in the wheel apparatus 70A. The light incident on the dichroic filters 82a to 82c and the transmission window 82d from the optical system of the stage preceding the wheel apparatus 70 forms a spot region A2 as shown in FIG. 5.

As with the wheel apparatus 70 of FIGS. 2 and 3, the wheel apparatus 70A of FIGS. 4 and 5 can reduce or minimize the influence of the spoke loss.

(Second Modification of First Embodiment)

Figure 6:
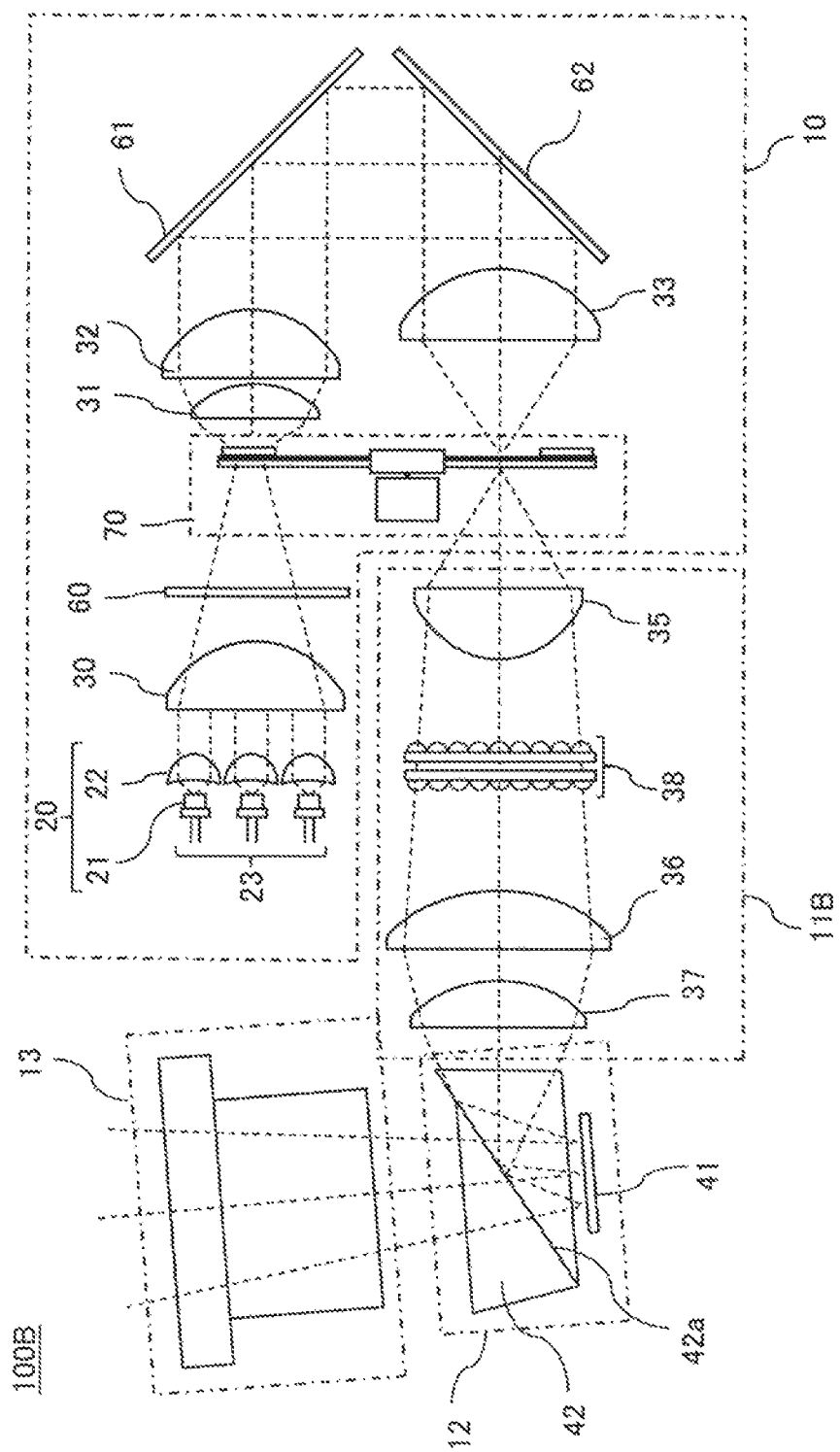
FIG. 6 is a schematic diagram showing a configuration of a projection-type image display apparatus 100E according to a second modification of the first embodiment.

FIG. 6 is a schematic diagram showing a configuration of a projection-type image display apparatus 100B according to a second modification of the first embodiment. The projection-type image display apparatus 100B includes an illumination optical system 11B instead of the illumination optical system 11 of FIG. 1.

The illumination optical system 11B includes a fly-eye lens 38 between the lenses 35, 36, instead of the rod integrator 34 of FIG. 1. The lens 35 makes the light transmitted through the wheel apparatus 70 substantially parallel. The fly-eye lens 38 is an array composed of a plurality of minute lenses and uniformizes the intensity distribution of the illumination light emitted from the light source apparatus 10, as with the rod integrator 34. The illumination light emitted from the fly-eye lens 38 is sent to the modulation device 12 via the lenses 36 and 37.

As with the projection-type image display apparatus 100 of FIG. 1, the projection-type image display apparatus 100B of FIG. 6 can reduce or minimize the influence of the spoke loss caused by the wheel apparatus 70.

(Third Modification of First Embodiment)

Figure 7:
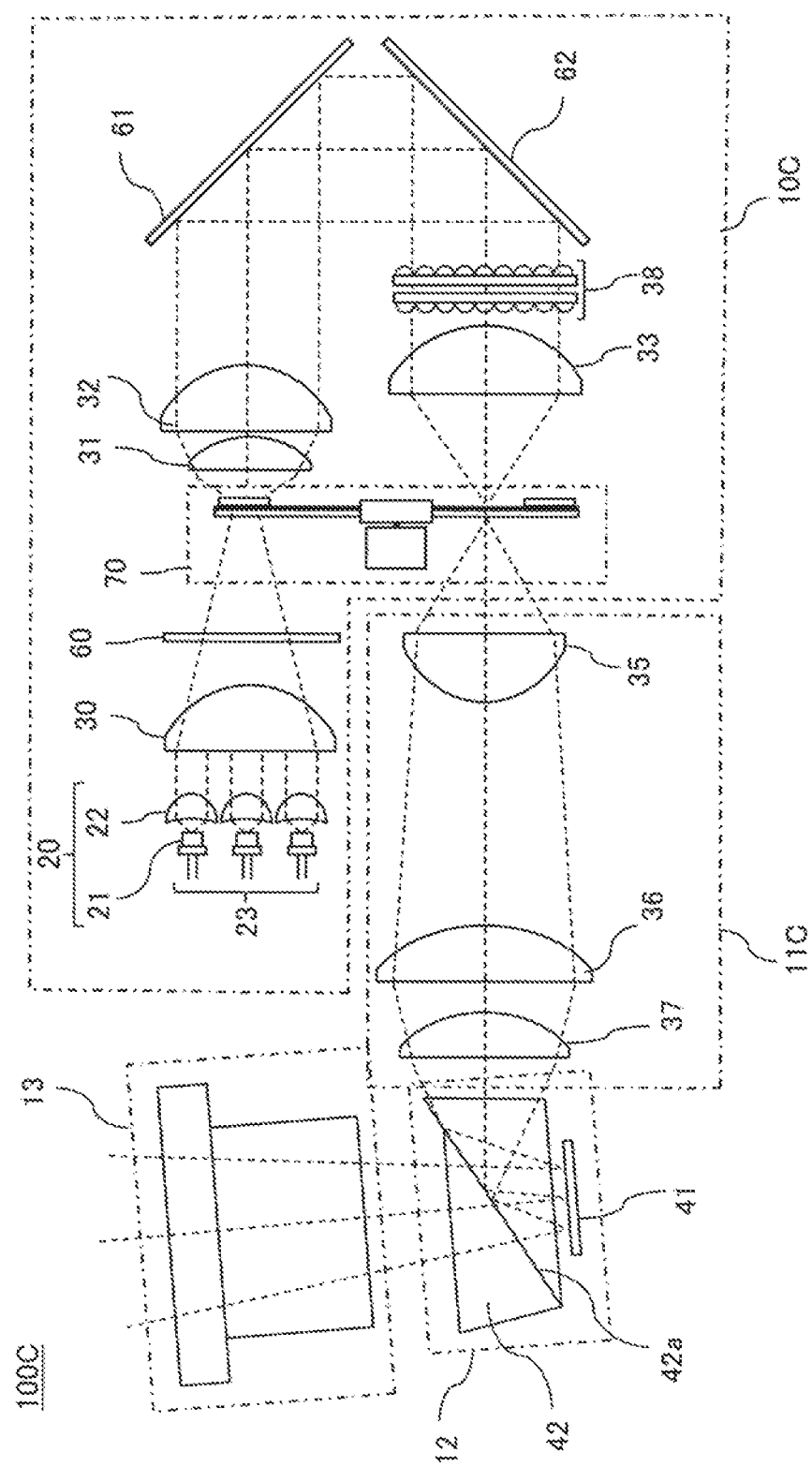
FIG. 7 is a schematic diagram showing a configuration of a projection-type image display apparatus 100C according to a third modification of the first embodiment.

FIG. 7 is a schematic diagram showing a configuration of a projection-type image display apparatus 100C according to a third modification of the first embodiment. The projection-type image display apparatus 100C includes a light source apparatus 10C and an illumination optical system 11C instead of the light source apparatus 10 and the illumination optical system 11 shown in FIG. 1.

The light source apparatus 10C includes the fly-eye lens 38 between the lenses 32, 33 in addition to the constituent elements of the light source apparatus 10 of FIG. 1. The illumination optical system 11C includes only the lenses 35 to 37 of the illumination optical system 11 of FIG. 1.

Even if the fly-eye lens 38 is disposed in the stage preceding the wheel apparatus 70 as shown in FIG. 7, the spot region of the incident light on the wheel apparatus 70 has longitudinal and lateral lengths different from each other (i.e., has a longitudinal direction). Therefore, as with the projection-type image display apparatus 100 of FIG. 1, the projection-type image display apparatus 100B of FIG. 7 can reduce or minimize the influence of the spoke loss caused by the wheel apparatus 70.

(Fourth Modification of First Embodiment)

Figure 8:
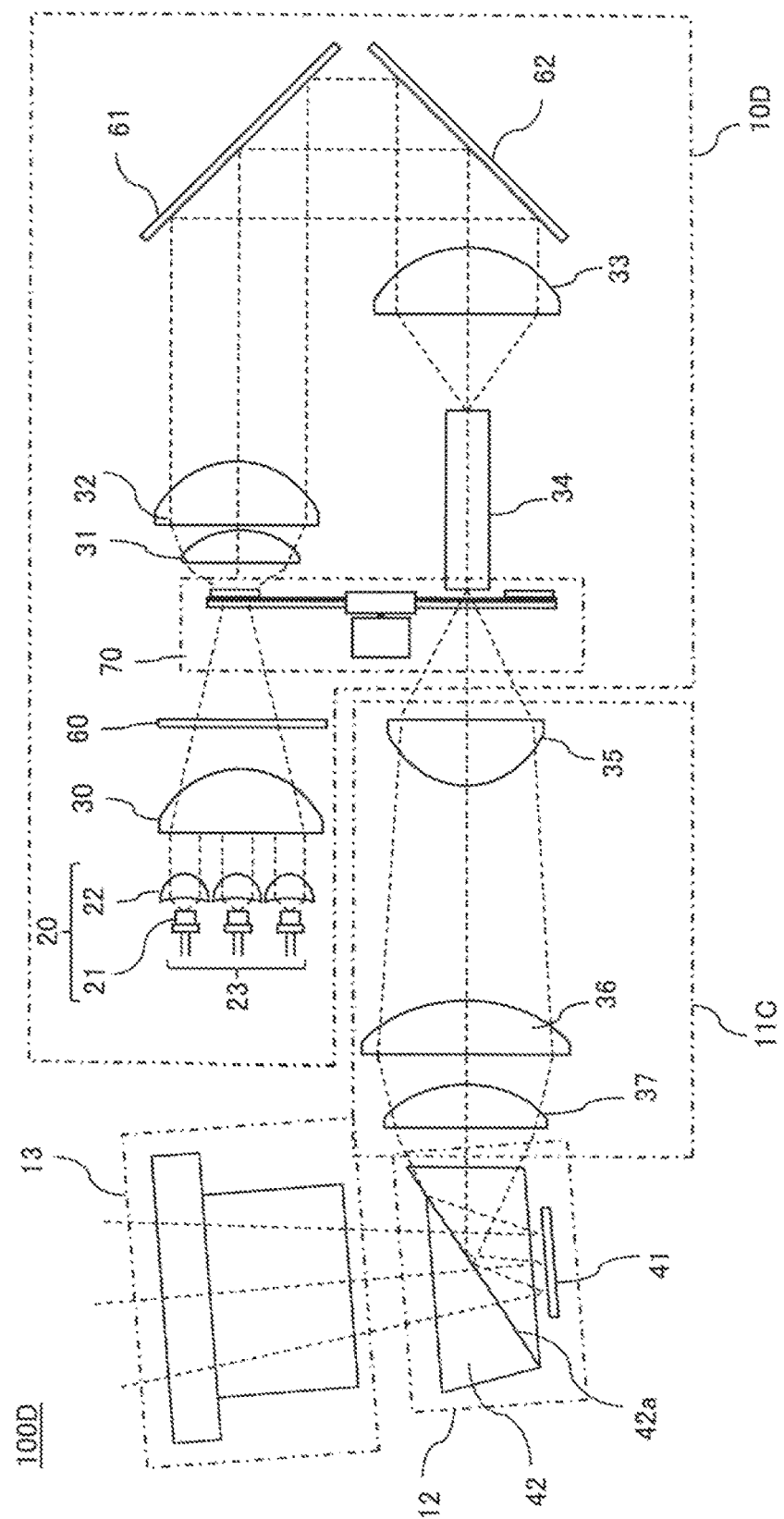
FIG. 8 is a schematic diagram showing a configuration of a projection-type image display apparatus 100D according to a fourth modification of the first embodiment.

FIG. 8 is a schematic diagram showing a configuration of a projection-type image display apparatus 100D according to a fourth modification of the first embodiment. The projection-type image display apparatus 100D includes a light source apparatus 100 instead of the light source apparatus 10C of FIG. 7.

The light source apparatus 10D includes a rod integrator 34 between the lens 33 and the wheel apparatus 70, instead of the fly-eye lens 38 of the light source apparatus 10C of FIG. 7.

Figure 9:
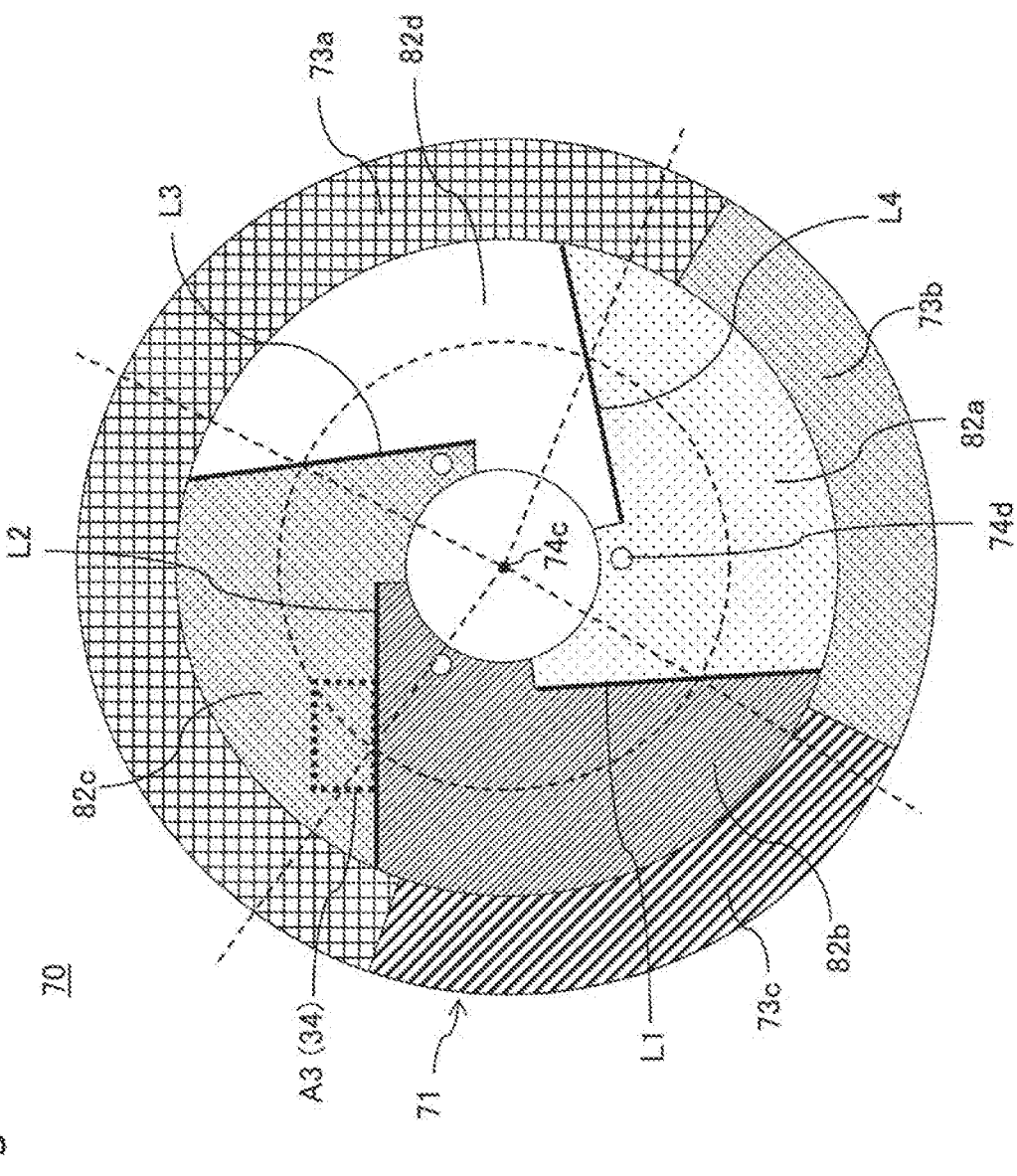
FIG. 9 is a plan view showing the configuration of the wheel apparatus 70 of FIG. 8.

FIG. 9 is a plan view showing the configuration of the wheel apparatus 70 of FIG. 8. The wheel apparatus 70 of FIG. 9 is configured similarly to the wheel apparatus 70 of FIG. 1. However, the light incident on the dichroic filters 82a to 82c and the transmission window 82d of the wheel apparatus 70 from the rod integrator 34 forms a spot region A3 as shown in FIG. 9. The contour of the spot region A3 has the same shape as the contour of the cross section of the rod integrator 34.

The wheel apparatus 70 is disposed relative to the rod integrator 34 such that when the surface of the wheel apparatus 70 at a predetermined rotational position is viewed along the optical axis, the spot region A3 overlaps with one of the multiple linear sections L1 to L4 and the one of the linear sections L1 to L4 becomes parallel to the longest one of the four sides of the cross section of the rod integrator 34. The example of FIG. 9 shows the case that the linear section L2 is parallel to the longitudinal direction of the spot region A3 when one side of the spot region A3 overlaps with the linear section L2. By arranging the wheel apparatus 70 and the optical system of the preceding stage in this way, the influence of the spoke loss can be reduced or minimized.

The cross section of the rod integrator 34 may have a shape other than a rectangle. The cross-sectional shape of the rod integrator 34 may be similar to the contour shape of the optical modulation element 41 when the surface of the optical modulation element 41 is viewed along the optical axis, for example. When the illumination light is substantially perpendicularly incident on the surface of the optical modulation element 41, the cross section of the rod integrator 34 may have a rectangular shape. When the illumination light is obliquely incident on the surface of the optical modulation element 41, the cross section of the rod integrator 34 may have parallelogram, trapezoidal, or other quadrilateral shapes. Regardless of the shape of the cross-section of the rod integrator 34, the influence of the spoke loss can be reduced or minimized by arranging the wheel apparatus 70 relative to the rod integrator 34 such that one of the linear sections L1 to L4 of the boundary lines becomes parallel to and overlaps with the longest one of the four sides of the cross-section of the rod integrator 34 when the surface of the wheel apparatus 70 at a predetermined rotational position is viewed along the optical axis.

(Summary of First Embodiment)

In this description, the phosphors 73a, 73b and the diffusion film 73c are also referred to as "first optical elements", and the dichroic filters 82a to 82c and the transmission window 82d are also referred to as "second optical elements".

In this description, the collimator lens 22, the condenser lens 30, and the diffusion plate 60 guiding the source light generated by the light source element 21 as the incident light to the phosphors 73a, 73b and the diffusion film 73c (the first optical elements) are also referred to as a "first optical system". In this description, the lenses 31 to 33 and the mirrors 61, 62 guiding the outgoing light from the phosphors 73a, 73b and the diffusion film 73c (the first optical elements) as the incident light to the dichroic filters 82a to 82c and the transmission window 82d (the second optical elements) are also referred to as a "second optical system". As shown in FIGS. 7 and 8, the second optical system may include the fly-eye lens 38 or the rod integrator 34.

The wheel apparatus, the light source apparatus, and the projection-type image display apparatus according to the first embodiment have the following configurations.

According to the wheel apparatus of the first embodiment, the wheel apparatus 70, 70A includes the substrate 71 rotatable around the rotation axis 74c, the at least one first optical element formed on the first circumference having the first radius r1 from the rotation axis 74c on the substrate 71, and a plurality of the second optical elements that are respectively formed in a plurality of regions different from each other along the second circumference having the second radius r2 different from the first radius r1 from the rotation axis 74c on the substrate 71 and that have wavelength characteristics different from each other. The first optical element includes at least one phosphor 73a and 73b. The plurality of the second optical elements is a plurality of color filters, or a combination of at least one color filter and an element generating an outgoing light having the same wavelength characteristic as the wavelength characteristic of an incident light. The regions of the plurality of the second optical elements are adjacent to each other via boundary lines including the linear sections L1 to L4, L11 to L14. The linear sections L1 to L4, L11 to L14 of the boundary lines intersect with the respective straight lines along the radius of the substrate 71 at the same intersection angle θ1 greater than 0 degrees and less than 90 degrees.

As a result, by forming the boundary lines of the regions of the dichroic filters 82a to 82c and the transmission window 82d as described above and arranging the wheel apparatus 70 and other lenses etc. as described above, the influence of the spoke loss can be reduced or minimized. Therefore, the wheel apparatus including both the phosphors and the color filters can be provided.

According to the light source apparatus of the first embodiment, the light source apparatus 10, 10C includes the wheel apparatus 70, 70A, the driving device 74 rotating the substrate 71 of the wheel apparatus 70, 70A, the light source element 21 generating the source light, the first optical system, and the second optical system.

As a result, the influence of the spoke loss can be reduced or minimized in the light source apparatus 10, 10C including the wheel apparatus 70, 70A.

According to the light source apparatus of the first embodiment, the wheel apparatus 70, 70A may be disposed relative to the second optical system such that when the surface of the wheel apparatus 70, 70A at a predetermined rotational position is viewed along the optical axis, the spot region of the incident light from the second optical system to the second optical elements overlaps with one of the multiple linear sections L1 to L4, L11 to L14 and the one of the linear sections L1 to L4, L11 to L14 becomes parallel to a longitudinal direction of the spot region.

As a result, the influence of the spoke loss can be reduced or minimized by arranging the wheel apparatus 70 and the optical system of the preceding stage as described above.

According to the light source apparatus of the first embodiment, the second optical system may include the rod integrator 34 having a quadrilateral cross-sectional shape. The wheel apparatus 70, 70A is disposed relative to the rod integrator 34 such that when the surface of the wheel apparatus 70, 70A at a predetermined rotational position is viewed along the optical axis, the spot region of the incident light from the rod integrator 34 to the second optical element overlaps with one of the multiple linear sections L1 to L4, L11 to L14 and the one of the linear sections L1 to L4, L11 to L14 becomes parallel to the longest one of the four sides of the cross section of the rod integrator 34.

As a result, the influence of the spoke loss can be reduced or minimized by arranging the wheel apparatus 70 and the optical system of the preceding stage as described above.

According to the projection-type image display apparatus of the first embodiment, the projection-type image display apparatus 100, 100B to 100D includes the light source apparatus 10, 10B, or 10C and the optical modulation element 41 spatially modulating the outgoing light of the second optical element of the light source apparatus.

As a result, the influence of the spoke loss can be reduced or minimized in the projection-type image display apparatus 100, 100B to 100D including the wheel apparatus 70.

Second Embodiment

A projection-type image display apparatus according to a second embodiment will hereinafter be described with reference to FIGS. 10 to 18. In the following description, differences from the projection-type image display apparatus according to the first embodiment will mainly be described. Portions having the same configurations as the first embodiment will be denoted by the same reference numerals and will not repeatedly be described in detail.

(Overview of Projection-Type Image Display Apparatus 100E)

Figure 10:
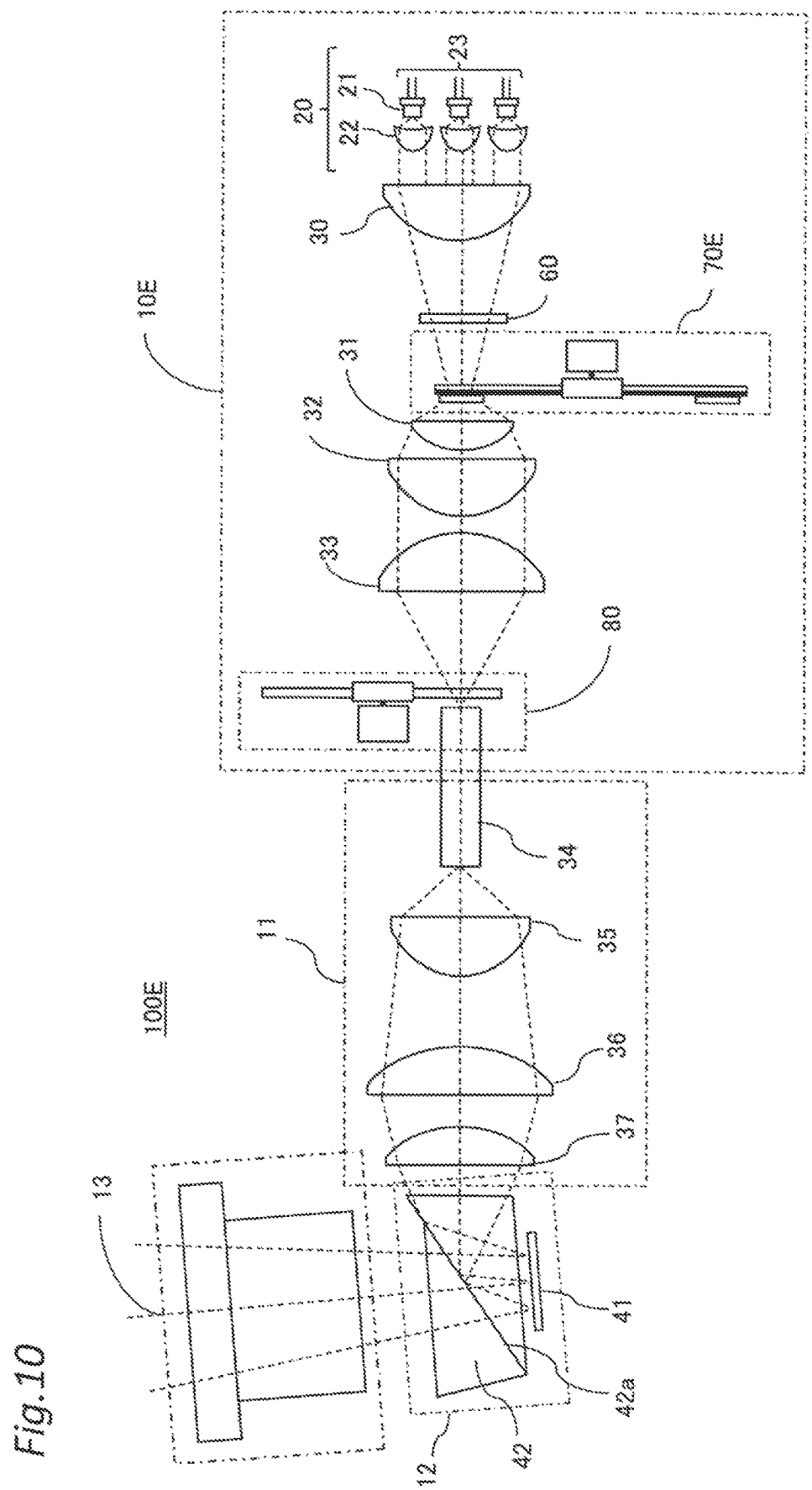
FIG. 10 is a schematic diagram showing a configuration of a projection-type image display apparatus 100E according to a second embodiment.

FIG. 10 is a schematic diagram showing a configuration of a projection-type image display apparatus 100E according to the second embodiment. The projection-type image display apparatus 100E includes a light source apparatus 10E instead of the light source apparatus 10 of FIG. 1. The light source apparatus 10E includes a phosphor wheel apparatus 70E and a color filter wheel apparatus 80 instead of the wheel apparatus 70 of FIG. 1.

In the case of the first embodiment, the one wheel apparatus 70 is provided with the phosphors 73a and 73b along with the dichroic filters 82a to 82c extracting color components of fluorescence, and this is an effective configuration for reducing the size of the optical system. On the other hand, in the case of the second embodiment, the color filter wheel apparatus 80 provided with dichroic filters extracting color components of fluorescence is disposed separately from the phosphor wheel apparatus 70E provided with phosphors.

(Configuration of Light Source Apparatus 10E)

The light source apparatus 10E includes the light source 20, the condenser lens 30, the diffusion plate 60, the phosphor wheel apparatus 70E, the lens 31, the lens 32, the lens 33, and the color filter wheel apparatus 80.

The source light emitted from the light source 20 is made incident on the phosphor wheel apparatus 70E via the condenser lens 30 and the diffusion plate 60.

The phosphor wheel apparatus 70E includes a phosphor excited by the incident source light to generate a fluorescence having a wavelength different from the wavelength of the source light. The phosphor wheel apparatus 70E further includes a diffusion film formed in a region different from the region of the phosphor and diffusing the incident source light. Details of the phosphor wheel apparatus 70E will be described later.

The fluorescence emitted from the phosphor of the phosphor wheel apparatus 70E is made incident on the color filter wheel apparatus 80 via the lenses 31 and 32, the mirrors 61 and 62, and the lens 33. Similarly, the source light emitted from the diffusion film of the phosphor wheel apparatus 70E is made incident on the color filter wheel apparatus 80 via the lenses 31 and 32, the mirrors 61 and 62, and the lens 33.

The color filter wheel apparatus 80 includes a dichroic filter transmitting the incident fluorescence and reflecting the incident source light. The color filter wheel apparatus 80 further includes a transmission window formed in a region different from the dichroic filter and transmitting the incident source light. Details of the color filter wheel apparatus 80 will be described later.

Color components of the fluorescence incident on the dichroic filter of the color filter wheel apparatus 80 are extracted through the dichroic filter. The source light emitted from the diffusion film of the phosphor wheel apparatus 70E and made incident on the color filter wheel apparatus 80 is transmitted through the transmission window of the color filter wheel apparatus 80. Lights of the color components transmitted through the dichroic filter (e.g., yellow light, red light, and green light) and the source light transmitted through the transmission window (i.e., blue light) serve as an illumination light generated by the light source apparatus 10E and proceed to the illumination optical system 11.

The illumination optical system 11, the modulation device 12, and the projection optical system 13 of FIG. 10 are configured similarly to the corresponding constituent elements of FIG. 1 and operate in the same way.

(Configuration of Phosphor Wheel Apparatus 70E)

Figure 11:
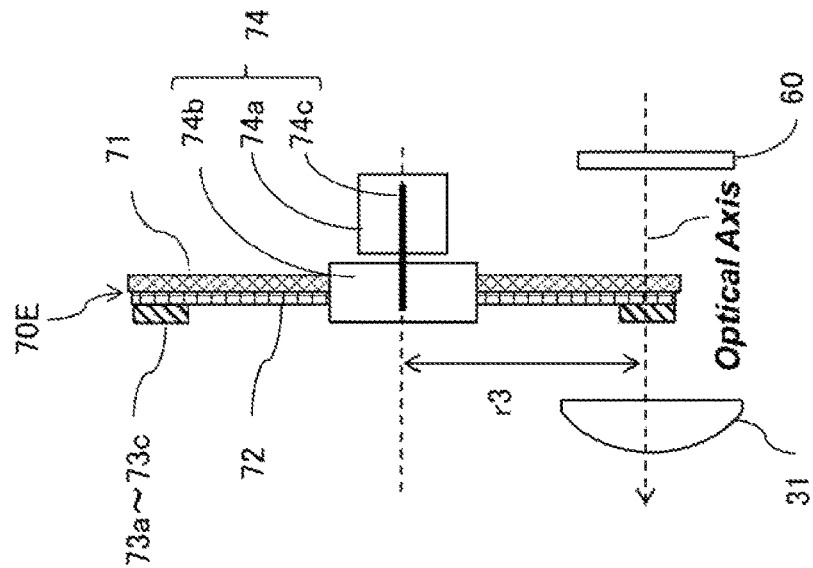
FIG. 11 is a side view showing a configuration of a phosphor wheel apparatus 70E of FIG. 10.
Figure 12:
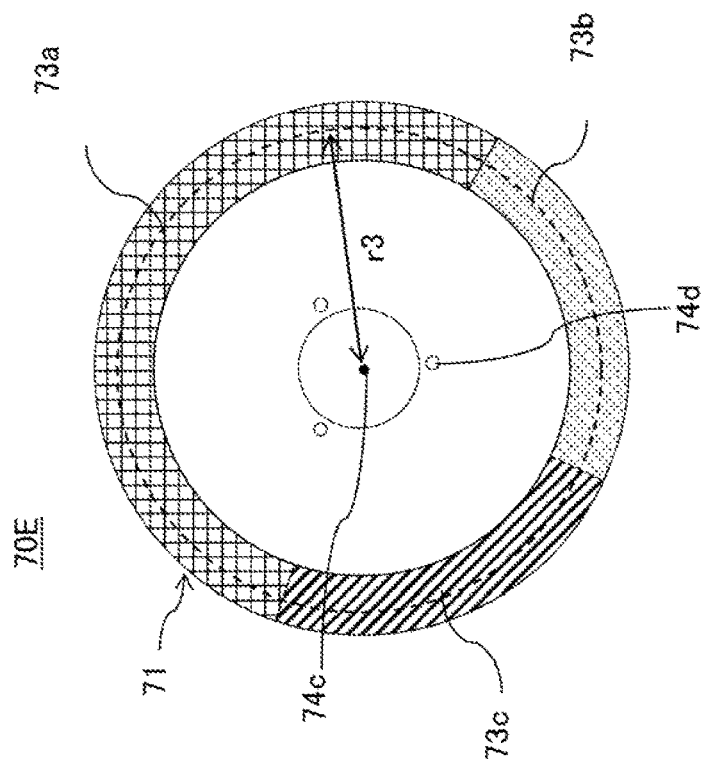
FIG. 12 is a plan view showing the configuration of the phosphor wheel apparatus 70E of FIG. 10.

A configuration of the phosphor wheel apparatus 70E will be described, with reference to FIGS. 11 and 12. FIG. 11 is a side view showing the configuration of the phosphor wheel apparatus 70E of FIG. 10. FIG. 12 is a plan view showing the configuration of the phosphor wheel apparatus 70E of FIG. 10. FIG. 11 shows a cross-sectional view when the phosphor wheel apparatus 70E is viewed in the same direction as FIG. 10. FIG. 12 shows a plan view when the phosphor wheel apparatus 70E is viewed from the left side of FIG. 10.

The phosphor wheel apparatus 70E includes the substrate 71, the dichroic filter 72, the phosphors 73a and 73b, the diffusion film 73c, and the driving device 74.

The phosphor wheel apparatus 70E includes at least one first optical element formed on a circumference having a radius r3 from the rotation axis 74c on the substrate 71. The first optical element includes at least one phosphor. In the example of FIGS. 2 and 3, the first optical element is a combination of the phosphors 73a and 73b and the diffusion film 73c that is an element generating an outgoing light having the same wavelength characteristic as the wavelength characteristic of the incident light.

The phosphor wheel apparatus 70E has a configuration in which the dichroic filters 82a to 82c and the transmission window 82d are removed from the wheel apparatus 70 of FIGS. 2 and 3.

As shown in FIG. 10, the phosphor wheel apparatus 70E is disposed in a stage subsequent to the diffusion plate 60, and the lens 31 is disposed in a stage subsequent to the phosphor wheel apparatus 70E, so that an outgoing light of the phosphors 73a, 73b and the diffusion film 73c is made incident on the lens 31. As shown in FIGS. 11 and 12, the optical axis of this light passes through the circumference having the radius r3 from the rotation axis 74c in the phosphor wheel apparatus 70E. The regions of the phosphors 73a, 73b and the diffusion film 73c are formed to include respective different arc portions of the circumference having the radius r3 from the rotation axis 74c.

(Color Filter Wheel Apparatus 80)

Figure 13:
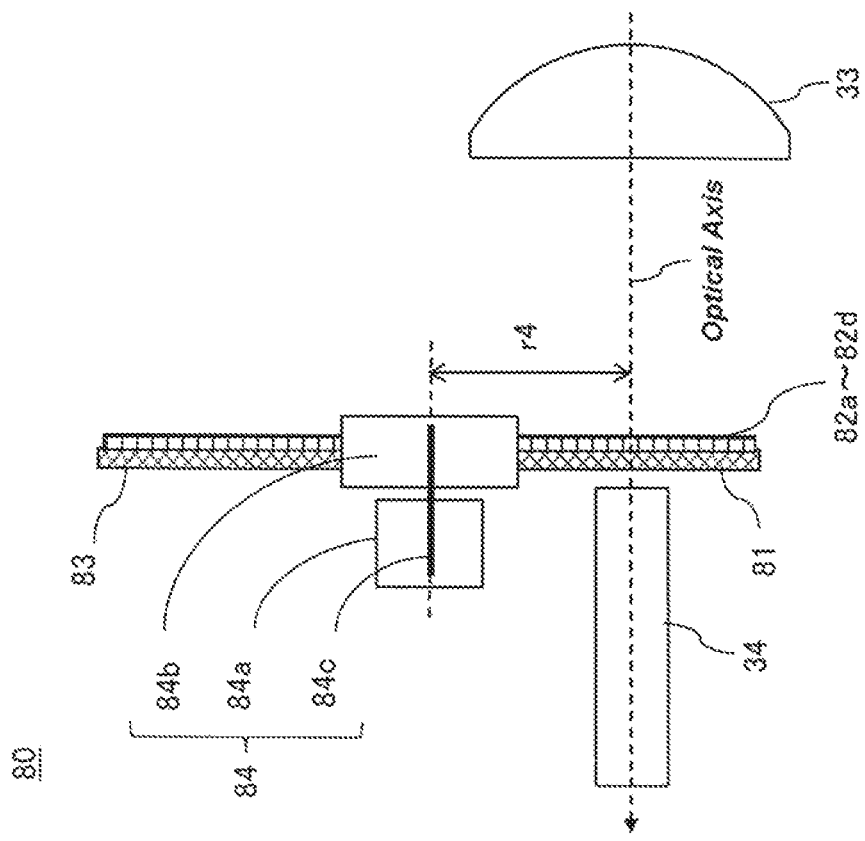
FIG. 13 is a side view showing a configuration of a color filter wheel apparatus 80 of FIG. 10.
Figure 14:
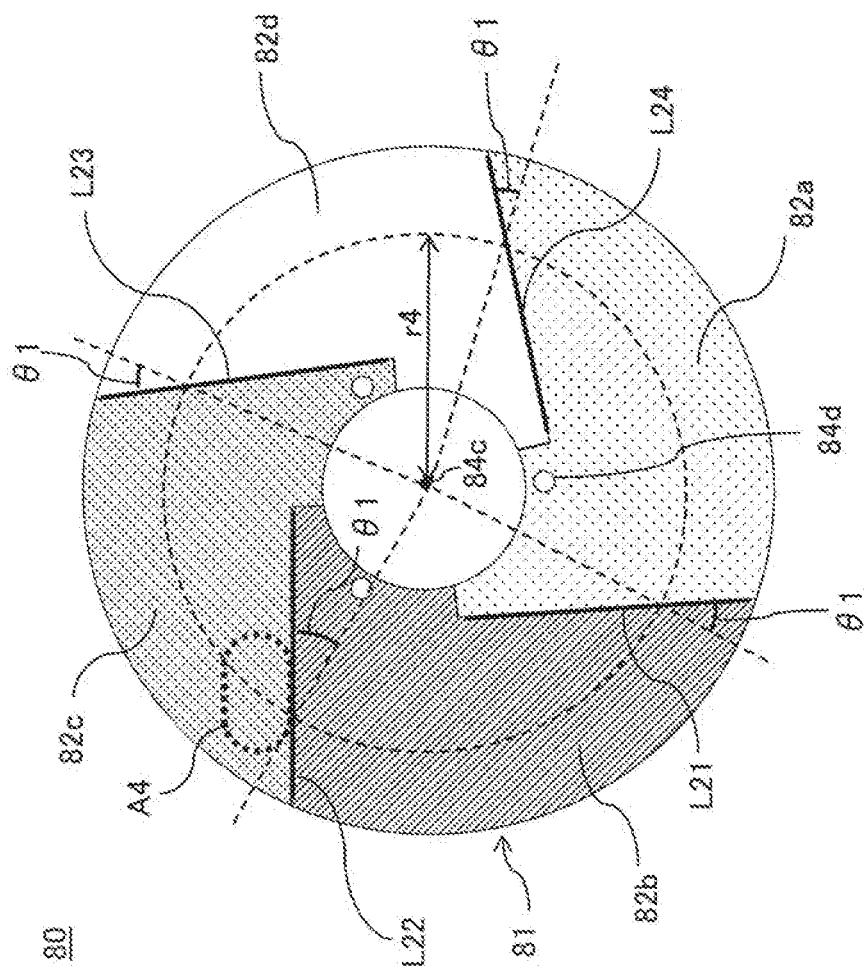
FIG. 14 is a plan view showing the configuration of the color filter wheel apparatus 80 of FIG. 10.

A configuration of the color filter wheel apparatus 80 will be described with reference to FIGS. 13 and 14. FIG. 13 is a side view showing the configuration of the color filter wheel apparatus 80 of FIG. 10. FIG. 14 is a plan view showing the configuration of the color filter wheel apparatus 80 of FIG. 10. FIG. 13 shows a cross-sectional view when the color filter wheel apparatus 80 is viewed in the same direction as FIG. 10. FIG. 14 shows a plan view when the color filter wheel apparatus 80 is viewed from the right side of FIG. 10.

The color filter wheel apparatus 80 includes a substrate 81, dichroic filters 82a to 82c, a transmission window 82d, an antireflection film 83, and a driving device 84.

The wheel apparatus 80 includes a plurality of second optical elements that are respectively formed in a plurality of different regions along a circumference having a radius r4 from the rotation axis 84c on the substrate 81 and that have wavelength characteristics different from each other. The plurality of the second optical elements is a plurality of color filters, or a combination of at least one color filter and an element generating an outgoing light having the same wavelength characteristic as the wavelength characteristic of the incident light. In the example of FIGS. 13 and 14, the plurality of the second optical elements is a combination of the dichroic filters 82a to 82c that are a plurality of color filters and the transmission window 82d that is an element generating an outgoing light having the same wavelength characteristic as the wavelength characteristic of the incident light.

The substrate 81 is made of a transparent material and can rotate around a rotation axis 84c (described later). The substrate 81 has a disk shape, for example. The substrate 81 is a glass substrate having a high transparency over the entire visible light range, for example.

The dichroic filters 82a to 82c are formed in a plurality of regions different from each other around the rotation axis 84c on the substrate 81. The dichroic filters 82a to 82c transmit the incident light having a wavelength of light of a predetermined color component of fluorescence and reflect the incident light having the wavelength of the source light. As a result, the dichroic filters 82a to 82c transmit the lights of the predetermined color components of the fluorescence generated by the phosphors 73a and 73b and reflect the source light made incident on the phosphors 73a and 73b of the wheel apparatus 80 from the light source 20 and passing through the phosphors 73a and 73b without being converted into the fluorescence.

The transmission window 82d is formed in a region different from the dichroic filters 82a to 82c in the substrate 81 and transmits incident light.

As shown in FIG. 10, the wheel apparatus 80 is disposed in a stage subsequent to the lens 33, and the rod integrator 34 is disposed in a stage subsequent to the color filter wheel apparatus 80, so that the outgoing light of the dichroic filters 82a to 82c and the transmission window 82d is made incident on the rod integrator 34. As shown in FIGS. 13 and 14, the optical axis of this light passes through the circumference having the radius r4 from the rotation axis 84c in the color filter wheel apparatus 80. Each region of the dichroic filters 82a to 82c and the transmission window 82d is formed to include different arc portions of the circumference having the radius r4 from the rotation axis 84c. The regions of the dichroic filters 82a to 82c and the transmission window 82d are formed to include respective different arc portions of the circumference having the radius r4 from the rotation axis 84c. The regions of the dichroic filters 82a to 82c and the transmission window 82d are adjacent to each other via boundary lines including linear sections L21 to L24. The linear sections L21 to L24 of the boundary lines intersect with respective straight lines along the radius of the substrate 81 at the same intersection angle θ1 greater than 0 degrees and less than 90 degrees, as in the case of FIG. 3.

The light incident on the dichroic filters 82a to 82c and the transmission window 82d from the optical system (the lenses 31 to 33) of the stage preceding the color filter wheel apparatus 80 forms a spot region A4 as shown in FIG. 14.

The dichroic filters 82a to 82c and the transmission window 82d of the color filter wheel apparatus 80 are configured substantially similarly to the corresponding constituent elements of FIGS. 2 and 3.

The antireflection film 83 transmits the lights of the color components transmitted through the dichroic filters 82a to 82c and the source light transmitted through the transmission window 82d and emits the lights from the color filter wheel apparatus 80. In the color filter wheel apparatus 80, the antireflection film 83 is formed on a surface opposite to the dichroic filters 82a to 82c. For example, in the color filter wheel apparatus 80, the dichroic filters 82a to 82c may be formed on a surface on which the fluorescence and the source light are made incident from the phosphor wheel apparatus 70E (i.e., the surface on the right side of FIG. 13), and the antireflection film 83 may be formed on a surface emitting the lights of the color components transmitted through the dichroic filters 82a to 82c and the source light transmitted through the transmission window 82d (i.e., the surface on the left side of FIG. 13).

The driving device 84 rotates the substrate 81 around the rotation axis 84c under the control of the control circuit (not shown) of the projection-type image display apparatus 100E. The driving device 84 includes a motor 84a, an attachment tool 84b, and the rotation axis 84c. The substrate 81 is attached to the motor 84a via the attachment tool 84b. For example, the attachment tool 84b sandwiches the substrate 81 with a hub and a holding member and fixes the substrate 81 with screws through screw holes 84d of the substrate 81.

The light source apparatus 10E is configured such that the yellow fluorescence generated by the phosphor 73a is made incident on the dichroic filters 82a and 82b, that the green fluorescence generated by the phosphor 73b is made incident on the dichroic filter 82c, and that the source light diffused by the diffusion material of the diffusion film 73c is made incident on the transmission window 82d. Therefore, as in the first embodiment, the sum of the angular widths of the dichroic filters 82a and 82b is set equal to the angular width of the region of the phosphor 73a. The angular width of the dichroic filter 82c is set equal to the angular width of the region of the phosphor 73b. The angular width of the transmission window 82d is set equal to the angular width of the region of the diffusion film 73c. The phosphor wheel apparatus 70E and the color filter wheel apparatus 80 have a predetermined phase difference from each other and are rotated in synchronization with each other at the same rotational speed.

(Reduction of Spoke Loss)

To reduce the influence of the spoke loss, the regions of the dichroic filters 82a to 82c and the transmission window 82d are formed such that the time of the spokes passing over the spot region A4 is reduced or minimized when the substrate 81 rotates. Therefore, the color filter wheel apparatus 80 is disposed relative to the optical system of the stage preceding the color filter wheel apparatus 80 such that when the surface of the color filter wheel apparatus 80 at a predetermined rotational position is viewed along the optical axis, the spot region A4 overlaps with one of the multiple linear sections L21 to L24 and this linear section becomes parallel to a longitudinal direction of the spot region A4. The example of FIG. 10 shows the case that the linear section L22 is parallel to the longitudinal direction of the spot region A4 when an edge of the spot region A4 overlaps with the linear section L22. By arranging the color filter wheel apparatus 80 and the optical system of the preceding stage in this way, the influence of the spoke loss can be reduced or minimized.

The color filter wheel apparatus 80 may be disposed relative to the optical system of the stage preceding the color filter wheel apparatus 80 such that when the spot region A4 overlaps with one of the multiple linear sections L21 to L24 at another position (e.g., the center), this linear section becomes parallel to the longitudinal direction of the spot region A4.

The spot region A4 is not limited to a rectangular shape, or a rectangular shape with rounded corners, and may have other shapes such as an ellipse as long as the region has longitudinal and lateral lengths different from each other (i.e., has a longitudinal direction).

As described above, the linear sections L21 to L24 of the boundary lines intersect with the respective straight lines along the radius of the substrate 81 at the same intersection angle θ1. Therefore, the influence of the spoke loss can be reduced or minimized when the spot region A4 passes over any boundary line among the boundary lines of the regions of the dichroic filters 82a to 82c and the transmission window 82d.

(Effects of Second Embodiment)

According to the color filter wheel apparatus 80 according to this embodiment, by forming the boundary lines of the regions of the dichroic filters 82a to 82c and the transmission window 82d and arranging the color filter wheel apparatus 80 and the optical system of the preceding stage as shown in FIGS. 13 and 14, the influence of the spoke loss can be reduced or minimized. As a result, the light source apparatus 10E and the projection-type image display apparatus 100E including the color filter wheel apparatus 80 according to this embodiment can improve the luminance of the image light as compared to the conventional techniques.

Even if the arrangement of the color filter wheel apparatus 80 and the optical system of the preceding stage is restricted, the influence of the spoke loss can be reduced or minimized by appropriately forming the boundary lines of the regions of the dichroic filters 82a to 82c and the transmission window 82d. This improves a degree of freedom of arrangement of the color filter wheel apparatus 80 and the optical system of the preceding stage, so that the small projection-type image display apparatus 100E can be achieved.

(First Modification of Second Embodiment)

Figure 15:
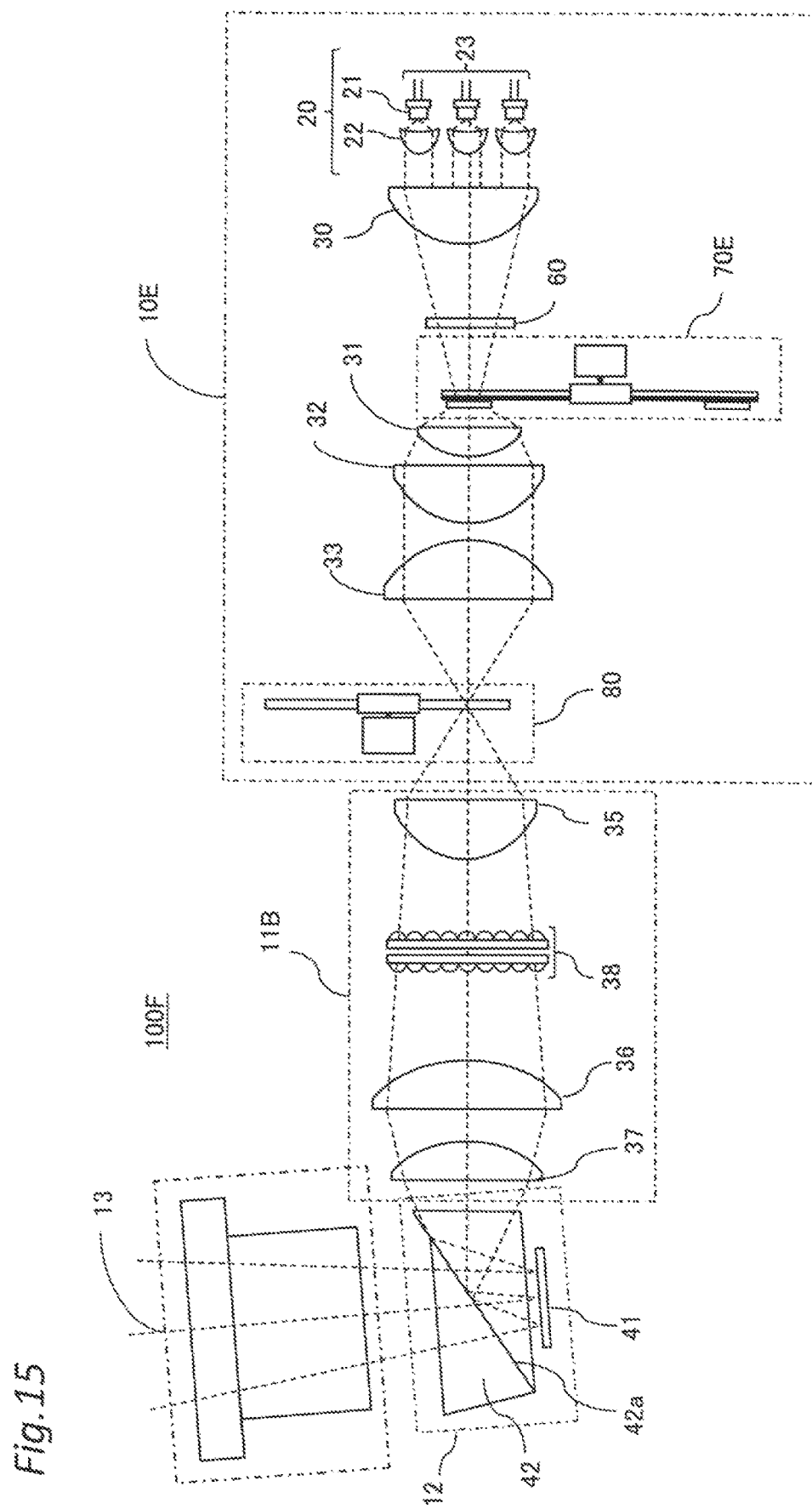
FIG. 15 is a schematic diagram showing a configuration of a projection-type image display apparatus 100F according to a first modification of the second embodiment.

FIG. 15 is a schematic diagram showing a configuration of a projection-type image display apparatus 100F according to a first modification of the second embodiment. The projection-type image display apparatus 100F includes the illumination optical system 11B instead of the illumination optical system 11 of FIG. 10. The illumination optical system 11B of FIG. 15 is configured similarly to the illumination optical system 11B of FIG. 6. As with the projection-type image display apparatus 100E of FIG. 10, the projection-type image display apparatus 100F of FIG. 15 can reduce or minimize the influence of the spoke loss caused by the color filter wheel apparatus 80.

(Second Modification of Second Embodiment)

Figure 16:
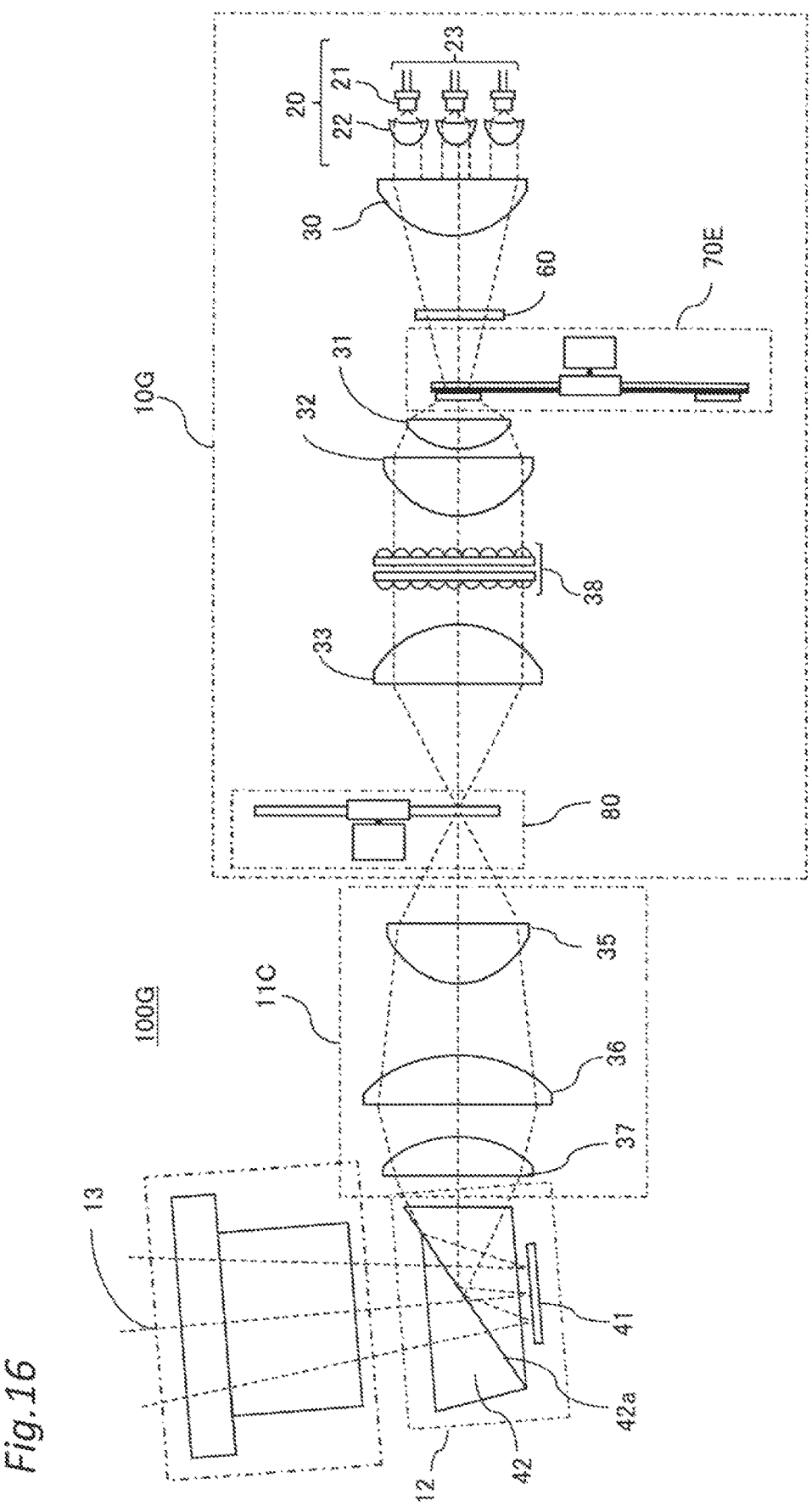
FIG. 16 is a schematic diagram showing a configuration of a projection-type image display apparatus 100G according to a second modification of the second embodiment.

FIG. 16 is a schematic diagram showing a configuration of a projection-type image display apparatus 100G according to a second modification of the second embodiment. The projection-type image display apparatus 100G includes a light source apparatus 10G and an illumination optical system 11C instead of the light source apparatus 10E and the illumination optical system 11 of FIG. 10. The light source apparatus 10G includes the fly-eye lens 38 between the lenses 32, 33 in addition to the constituent elements of the light source apparatus 10E of FIG. 10. The illumination optical system 11C of FIG. 16 is configured similarly to the illumination optical system 11C of FIG. 7. As with the projection-type image display apparatus 100E of FIG. 10, the projection-type image display apparatus 100G of FIG. 16 can reduce or minimize the influence of the spoke loss caused by the color filter wheel apparatus 80.

(Third Modification of Second Embodiment)

Figure 17:
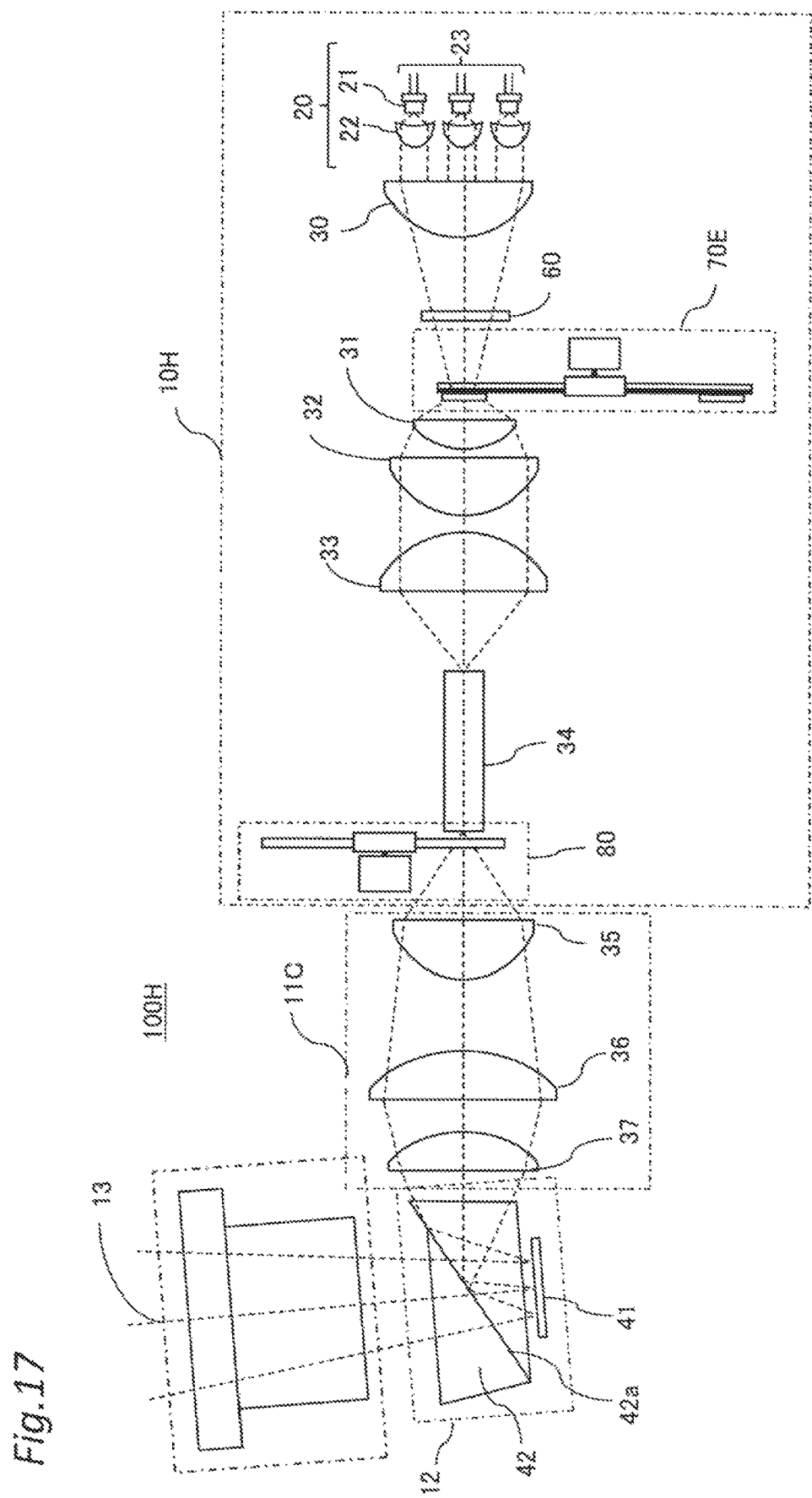
FIG. 17 is a schematic diagram showing a configuration of a projection-type image display apparatus 100H according to a third modification of the second embodiment.

FIG. 17 is a schematic diagram showing a configuration of a projection-type image display apparatus 100H according to a third modification of the second embodiment. The projection-type image display apparatus 100H includes a light source apparatus 10H instead of the light source apparatus 10G of FIG. 16.

The light source apparatus 10H includes the rod integrator 34 between the lens 33 and the color filter wheel apparatus 80, instead of the fly-eye lens 38 of the light source apparatus 10G of FIG. 16.

Figure 18:
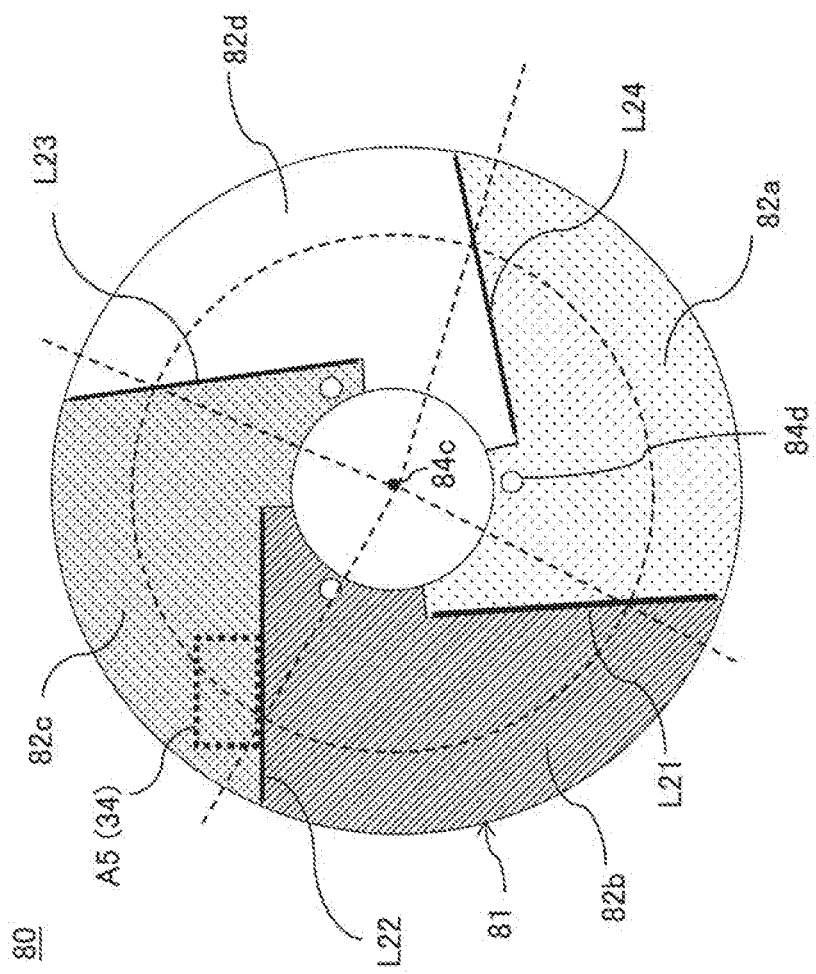
FIG. 18 is a plan view showing the configuration of the color filter wheel apparatus 80 of FIG. 17.

FIG. 18 is a plan view showing the configuration of the color filter wheel apparatus 80 of FIG. 17. The color filter wheel apparatus 80 of FIG. 18 is configured similarly to the color filter wheel apparatus 80 of FIG. 10. However, the light incident on the dichroic filters 82a to 82c and the transmission window 82d of the color filter wheel apparatus 80 from the rod integrator 34 forms a spot region A5 as shown in FIG. 18. The contour of the spot region A5 has the same shape as the contour of the cross section of the rod integrator 34.

The color filter wheel apparatus 80 is disposed relative to the rod integrator 34 such that when the surface of the color filter wheel apparatus 80 at a predetermined rotational position is viewed along the optical axis, the spot region A5 overlaps with one of the multiple linear sections L21 to L24 and the one of the linear sections L21 to L24 becomes parallel to the longest one of the four sides of the cross section of the rod integrator 34. The example of FIG. 18 shows the case that the linear section L22 is parallel to the longitudinal direction of the spot region A5 when one side of the spot region A5 overlaps with the linear section L22. By arranging the color filter wheel apparatus 80 and the optical system of the preceding stage in this way, the influence of the spoke loss can be reduced or minimized.

(Summary of Second Embodiment)

In the second embodiment, the phosphor wheel apparatus 70E is also referred to as "first wheel apparatus", and the color filter wheel apparatus 80 is also referred to as "second wheel apparatus" or simply "wheel apparatus".

The wheel apparatus, the light source apparatus, and the projection-type image display apparatus according to the second embodiment have the following configurations.

According to the wheel apparatus of the second embodiment, the color filter wheel apparatus 80 includes the substrate 81 rotatable around the rotation axis 84c and a plurality of the optical elements respectively formed in a plurality of regions different from each other around the rotation axis 84c on the substrate 81 and having wavelength characteristics different from each other. The regions of the plurality of the optical elements are adjacent to each other via boundary lines including linear sections L21 to L24. The linear sections L21 to L24 of the boundary lines intersect with respective straight lines along the radius of the substrate 81 at the same intersection angle θ1 greater than 0 degrees and less than 90 degrees. The plurality of the optical elements is a plurality of color filters, or a combination of at least one color filter and an element generating an outgoing light having the same wavelength characteristic as the wavelength characteristic of the incident light.

As a result, by forming the boundary lines of the regions of the dichroic filters 82a to 82c and the transmission window 82d as described above and arranging the color filter wheel apparatus 80 and other lenses etc. as described above, the influence of the spoke loss can be reduced or minimized.

According to the light source apparatus of the second embodiment, the light source apparatuses 10E, 10G, 10H includes the phosphor wheel apparatus 70E, the driving device 74, the color filter wheel apparatus 80, the driving device 84, the light source element 21 generating the source light, the first optical system, and the second optical system. The phosphor wheel apparatus 70E includes the substrate 71 rotatable around the rotation axis 74c, and the at least one first optical element is formed on the substrate 71. The first optical element includes at least one phosphor. The driving device 74 rotates the substrate 71 of the phosphor wheel apparatus 70E. The driving device 84 rotates the substrate 81 of the color filter wheel apparatus 80.

As a result, the influence of the spoke loss can be reduced or minimized in the light source apparatus 10E, 10G, 10H including the color filter wheel apparatus 80.

According to the light source apparatus of the second embodiment, the color filter wheel apparatus 80 may be disposed relative to the second optical system such that when the surface of the color filter wheel apparatus 80 at a predetermined rotational position is viewed along the optical axis, the spot region of the incident light from the second optical system to the optical element of the color filter wheel apparatus 80 overlaps with one of the multiple linear sections L21 to L24 and the one of the linear sections L21 to L24 becomes parallel to the longitudinal direction of the spot region.

As a result, the influence of the spoke loss can be reduced or minimized by arranging the color filter wheel apparatus 80 and the optical system of the preceding stage as described above.

According to the light source apparatus of the second embodiment, the second optical system may include the rod integrator 34 having a quadrilateral cross-sectional shape. The color filter wheel apparatus 80 may be disposed relative to the rod integrator 34 such that when the surface of the color filter wheel apparatus 80 at a predetermined rotational position is viewed along the optical axis, the spot region of the incident light from the rod integrator 34 to the color filter wheel apparatus 80 overlaps with one of the multiple linear sections L21 to L24 and the one of the linear sections L21 to L24 becomes parallel to the longest one of the four sides of the cross section of the rod integrator 34.

As a result, the influence of the spoke loss can be reduced or minimized by arranging the color filter wheel apparatus 80 and the optical system of the preceding stage as described above.

According to the projection-type image display apparatus of the second embodiment, the projection-type image display apparatus 100E to 100G includes the light source apparatus 10E, 10G, 10H, and the optical modulation element 41 spatially modulating the outgoing light of the color filter wheel apparatus 80 of the light source apparatus 10E, 10G, 10H.

As a result, the influence of the spoke loss can be reduced or minimized in the projection-type image display apparatus 100E to 100O including the color filter wheel apparatus 80.

Third Embodiment

A projection-type image display apparatus according to a third embodiment will hereinafter be described with reference to FIGS. 19 and 20. In the following description, differences from the projection-type image display apparatus according to the first embodiment will mainly be described. Portions having the same configurations as the first embodiment will be denoted by the same reference numerals and will not repeatedly be described in detail.

(Overview of Projection-Type Image Display Apparatus)

Figure 19:
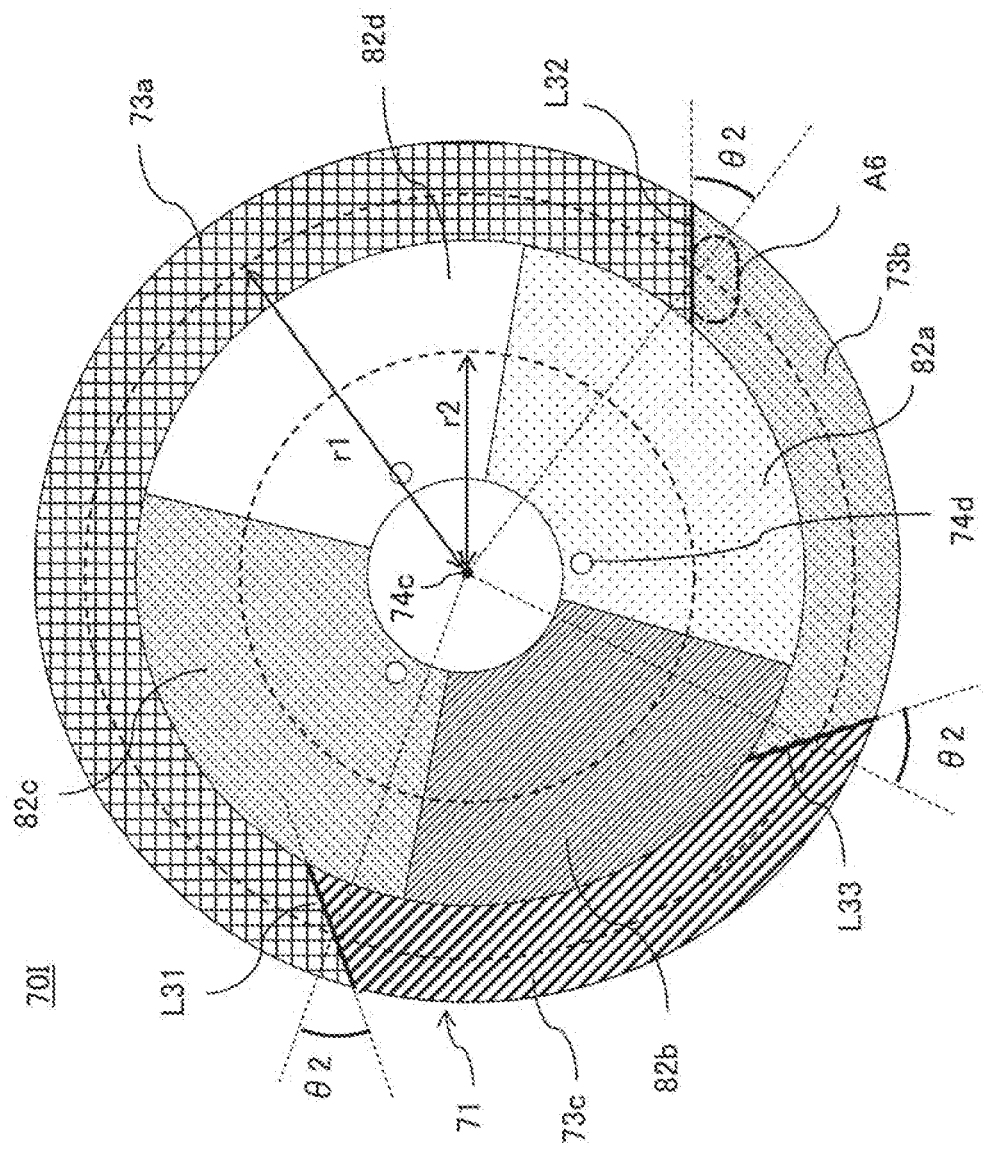
FIG. 19 is a plan view showing a configuration of a wheel apparatus 70I according to a third embodiment.

FIG. 19 is a plan view showing a configuration of a wheel apparatus 70I according to the third embodiment. The projection-type image display apparatus according to the third embodiment includes a wheel apparatus 70I instead of the wheel apparatus 70 of FIG. 1.

The first embodiment is intended to reduce or minimize the influence of the spoke loss occurring at the boundary lines of the regions of the dichroic filters 82a to 82c and the transmission window 82d (second optical elements). On the other hand, the third embodiment is intended to additionally or alternatively reduce or minimize the influence of the spoke loss occurring at the boundary lines of the regions of the phosphors 73a, 73b and the diffusion film 73c (first optical elements).

(Configuration of Wheel Apparatus 70I)

A wheel apparatus 70I of FIG. 19 includes the substrate 71, the dichroic filter 72 (not shown), the phosphors 73a and 73b, the diffusion film 73c, the driving device 74, the dichroic filters 82a to 82c, and the transmission window 82d.

The wheel apparatus 70I includes a plurality of the first optical elements that are respectively formed in a plurality of different regions along the first circumference having the first radius r1 from the rotation axis 74c on the substrate 71 and that have wavelength characteristics different from each other. The plurality of the first optical elements is a plurality of phosphors, or a combination of at least one phosphor and an element generating an outgoing light having the same wavelength characteristic as the wavelength characteristic of the incident light. In the example of FIG. 19, the first optical elements are a combination of the phosphors 73a and 73b and the diffusion film 73c that is an element generating an outgoing light having the same wavelength characteristic as the wavelength characteristic of the incident light.

The optical axis of the incident light to the phosphors 73a, 73b and the diffusion film 73c passes through the circumference having the radius r1 from the rotation axis 74c in the wheel apparatus 70I. The regions of the phosphors 73a, 73b and the diffusion film 73c are formed to include respective different arc portions of the circumference having the radius r1 from the rotation axis 74c. The regions of the phosphors 73a, 73b and the diffusion film 73c are adjacent to each other via boundary lines including linear sections L31 to L33. The linear sections L31 to L33 of the boundary lines intersect with respective straight lines along the radius of the substrate 71 at a same intersection angle θ2 greater than 0 degrees and less than 90 degrees.

The wheel apparatus 70I includes at least one second optical element formed on the second circumference having the second radius r2 from the rotation axis 74c on the substrate 71. The second optical element includes at least one color filter. In the example of FIG. 19, the second optical element is a combination of the dichroic filters 82a to 82c that are a plurality of color filters and the transmission window 82d that is an element generating an outgoing light having the same wavelength characteristic as the wavelength characteristic of the incident light.

The optical axis of the incident light onto the dichroic filters 82a to 82c and the transmission window 82d passes through the circumference having the radius r2 from the rotation axis 74c in the wheel apparatus 70I. The regions of the dichroic filters 82a to 82c and the transmission window 82d are formed to include respective different arc portions of the circumference having the radius r2 from the rotation axis 74c. In the example of FIG. 19, the regions of the dichroic filters 82a to 82c and the transmission window 82d are each formed into a fan shape.

The light incident on the phosphors 73a, 73b and the diffusion film 73c from the optical system (the lens 30 and the diffusion plate 60) of the stage preceding the wheel apparatus 70I forms a spot region A6 as shown in FIG. 19.

In other respects, the wheel apparatus 70I of FIG. 19 is configured similarly to the wheel apparatus 70 of FIGS. 2 and 3.

(Reduction of Spoke Loss)

To reduce the influence of the spoke loss, the regions of the phosphors 73a, 73b and the diffusion film 73c are formed such that the time of the spokes passing over the spot region A6 is reduced or minimized when the substrate 71 rotates. Therefore, the wheel apparatus 70I is disposed relative to the optical system of the stage preceding the wheel apparatus 70I such that when the surface of the wheel apparatus 70I at a predetermined rotational position is viewed along the optical axis, the spot region A6 overlaps with one of the multiple boundary lines L31 to L33 and this linear section becomes parallel to a longitudinal direction of the spot region A6. The example of FIG. 19 shows the case that the boundary line L32 is parallel to the longitudinal direction of the spot region A6 when an edge of the spot region A6 overlaps with the boundary line L32. By arranging the wheel apparatus 70I and the optical system of the preceding stage in this way, the influence of the spoke loss can be reduced or minimized.

The wheel apparatus 70I may be disposed relative to the optical system of the stage preceding the wheel apparatus 70I such that when the spot region A6 overlaps with one of the multiple boundary lines L31 to L33 at another position (e.g., the center), this linear section becomes parallel to the longitudinal direction of the spot region A6.

The spot region A6 is not limited to a rectangular shape, or a rectangular shape with rounded corners, and may have other shapes such as an ellipse as long as the region has longitudinal and lateral lengths different from each other (i.e., has a longitudinal direction).

As described above, the boundary lines L31 to L33 intersect with the respective straight lines along the radius of the substrate 71 at the same intersection angle θ2. Therefore, the influence of the spoke loss can be reduced or minimized when the spot region A6 passes over any boundary line among the boundary lines of the regions of the phosphors 73a, 73b and the diffusion film 73c.

(Effects of Third Embodiment)

According to the wheel apparatus 70I of this embodiment, by forming the boundary lines of the regions of the phosphors 73a, 73b and the diffusion film 73c and arranging the wheel apparatus 70I and the optical system of the preceding stage as shown in FIG. 19, the influence of the spoke loss can be reduced or minimized. As a result, the light source apparatus and the projection-type image display apparatus including the wheel apparatus 70I according to this embodiment can improve the luminance of the image light as compared to the conventional techniques.

(Modification of Third Embodiment).

Figure 20:
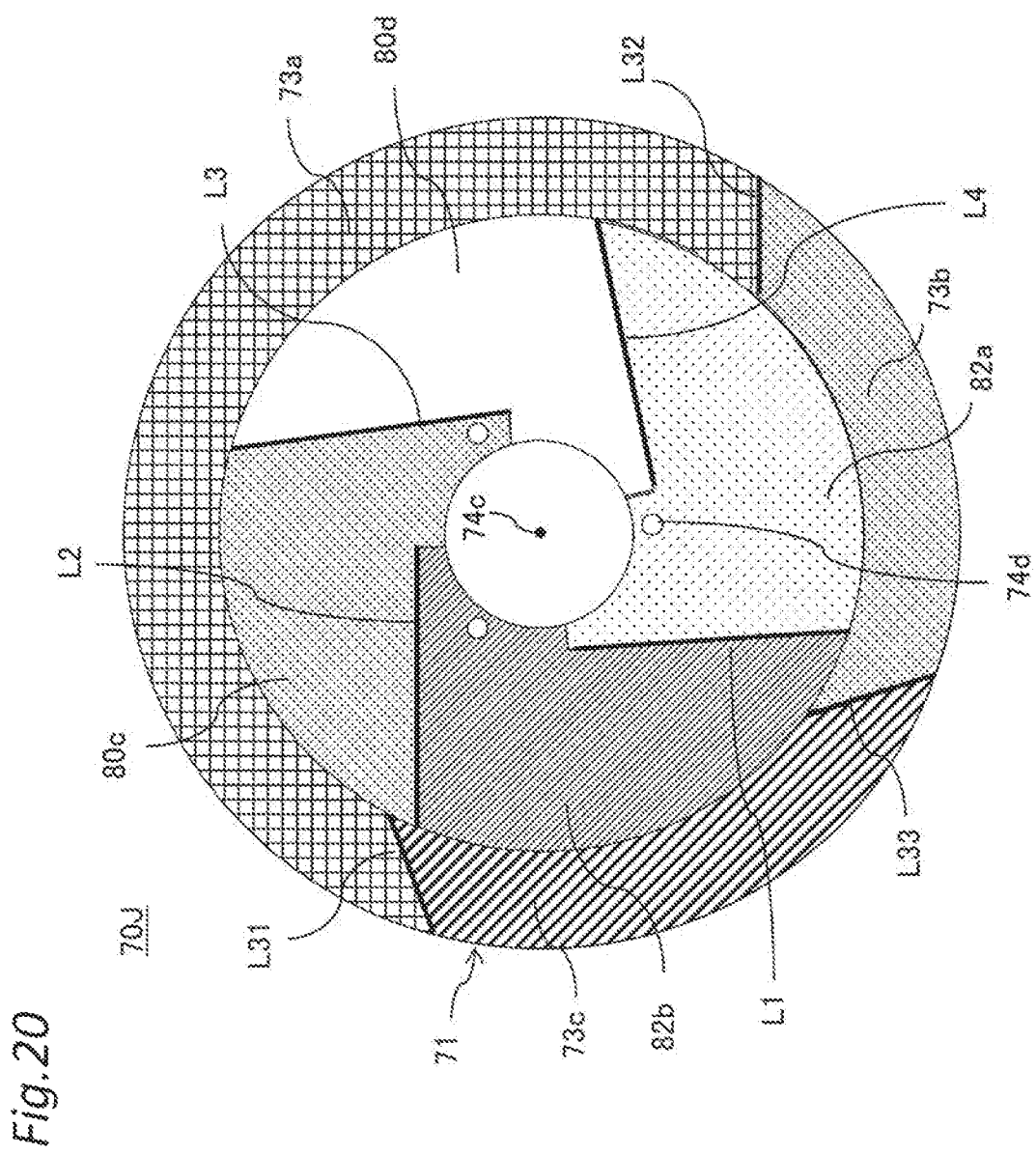
FIG. 20 is a plan view showing a configuration of a wheel apparatus 70J according to a modification of the third embodiment.

FIG. 20 is a plan view showing a configuration of a wheel apparatus 70J according to a modification of the third embodiment. The configuration according to the first embodiment may be combined with the configuration according to the third embodiment. In the wheel apparatus 70J of FIG. 20, the linear sections L31 to L33 of the boundary lines of the phosphors 73a, 73b and the diffusion film 73c intersect with respective straight lines along the radius of the substrate 71 at the same intersection angle greater than 0 degrees and less than 90 degrees. Additionally, in the wheel apparatus 70J of FIG. 20, the linear sections L1 to L4 of the boundary lines of the dichroic filters 82a to 82c and the transmission window 82d intersect with respective straight lines along the radius of the substrate 71 at the same intersection angle greater than 0 degrees and less than 90 degrees. As a result, the influence of the spoke loss can be reduced or minimized at both the boundary lines of the regions of the phosphors 73a, 73b and the diffusion film 73c and the boundary lines of the regions of the dichroic filters 82a to 82c and the transmission window 82d.

(Summary of Third Embodiment)

The wheel apparatus, the light source apparatus, and the projection-type image display apparatus according to the third embodiment have the following configurations.

According to the wheel apparatus of the third embodiment, the wheel apparatus 70I includes the substrate 71 rotatable around the rotation axis 74c, a plurality of the first optical elements that are respectively formed in a plurality of different regions along the first circumference having the first radius r1 from the rotation axis 74c on the substrate 71 and that have wavelength characteristics different from each other, and the at least one second optical element formed on the second circumference having the second radius r2 different from the first radius r1 from the rotation axis 74c on the substrate 71. The plurality of the first optical elements is a plurality of phosphors, or a combination of at least one phosphor and an element generating an outgoing light having the same wavelength characteristic as the wavelength characteristic of an incident light. The second optical element includes at least one color filter. The regions of the plurality of the first optical elements are adjacent to each other via boundary lines including the first linear sections L31 to L33. The first linear sections L31 to L33 intersect with the respective straight lines along the radius of the substrate 71 at the same intersection angle θ2 greater than 0 degrees and less than 90 degrees.

As a result, by forming the boundary lines of the phosphors 73a, 73b and the diffusion film 73c as described above and arranging the wheel apparatus 70I and other lenses etc. as described above, the influence of the spoke loss can be reduced or minimized. Therefore, the wheel apparatus including both the phosphors and the color filters can be provided.

According to the wheel apparatus of the third embodiment, the wheel apparatus 70J includes the substrate 71 rotatable around the rotation axis 74c, a plurality of the first optical elements that are respectively formed in a plurality of different regions along the first circumference having the first radius r1 from the rotation axis 74c on the substrate 71 and that have wavelength characteristics different from each other, and a plurality of the second optical elements that are respectively formed in a plurality of different regions along the second circumference having the second radius r2 different from the first radius r1 from the rotation axis 74c on the substrate 71 and that have wavelength characteristics different from each other. The plurality of the first optical elements is a plurality of phosphors, or a combination of at least one phosphor and an element generating an outgoing light having the same wavelength characteristic as the wavelength characteristic of an incident light. The plurality of the second optical elements is a plurality of color filters, or a combination of at least one color filter and an element generating an outgoing light having the same wavelength characteristic as the wavelength characteristic of the incident light. The regions of the plurality of the first optical elements are adjacent to each other via boundary lines including the first linear sections L31 to L33. The first linear sections L31 to L33 intersect with the respective straight lines along the radius of the substrate 71 at the same first intersection angle θ2 greater than 0 degrees and less than 90 degrees. The regions of the plurality of the second optical elements are adjacent to each other via boundary lines including the second linear sections L1 to L4. The second linear sections L1 to L4 intersect with the respective straight lines along the radius of the substrate 71 at the same second intersection angle θ1 greater than 0 degrees and less than 90 degrees.

As a result, by forming the boundary lines of the phosphors 73a, 73b and the diffusion film 73c as described above, forming the boundary lines of the regions of the dichroic filters 82a to 82c and the transmission window 82d as described above, and arranging the wheel apparatus 70J and other lenses etc. as described above, the influence of the spoke loss can be reduced or minimized. Therefore, the wheel apparatus including both the phosphors and the color filters can be provided.

According to the light source apparatus of the third embodiment, the light source apparatus includes the wheel apparatus 70I, 70J, the driving device 74 rotating the substrate 71 of the wheel apparatuses 70I, 70J, the light source element 21 generating the source light, and the first optical system guiding the source light generated by the light source element 21 as the incident light to the first optical element, and the second optical system guiding the outgoing light of the first optical element as the incident light to the second optical element.

As a result, the influence of the spoke loss can be reduced or minimized in the light source apparatus including the wheel apparatus 70I, 70J.

According to the light source apparatus of the third embodiment, the wheel apparatus 70I, 70J may be disposed relative to the first optical system such that when the surface of the wheel apparatus 70I, 70J at a predetermined rotational position is viewed along the optical axis, the spot region of the incident light from the first optical system to the first optical elements overlaps with one of the multiple first linear sections L31 to L33 and the one of the first linear sections L31 to L33 becomes parallel to the longitudinal direction of the spot region.

As a result, the influence of the spoke loss can be reduced or minimized by arranging the wheel apparatus 70I, 70J and the optical system of the preceding stage as described above.

According to the light source apparatus of the third embodiment, the wheel apparatus 70J may be disposed relative to the second optical system such that when the surface of the wheel apparatus 70J at a predetermined rotational position is viewed along the optical axis, the spot region of the incident light from the second optical system to the second optical elements overlaps with one of the multiple second linear sections L1 to L4 and the one of the second linear sections L1 to L4 becomes parallel to the longitudinal direction of the spot region.

As a result, the influence of the spoke loss can be reduced or minimized by arranging the wheel apparatus 70J and the optical system of the preceding stage as described above.

According to the light source apparatus of the third embodiment, the second optical system may include the rod integrator 34 having a quadrilateral cross-sectional shape. The wheel apparatus 70J is disposed relative to the rod integrator 34 such that when the surface of the wheel apparatus 70J at a predetermined rotational position is viewed along the optical axis, the spot region of the incident light from the rod integrator 34 to the optical element overlaps with one of the multiple linear sections and the one of the linear sections becomes parallel to the longest one of the four sides of the cross section of the rod integrator 34.

As a result, the influence of the spoke loss can be reduced or minimized by arranging the wheel apparatus 70J and the optical system of the preceding stage as described above.

According to the projection-type image display apparatus of the third embodiment, the projection-type image display apparatus includes the light source apparatus and the optical modulation element 41 spatially modulating the outgoing light of the second optical element of the light source apparatus.

As a result, the influence of the spoke loss can be reduced or minimized in the projection-type image display apparatus including the wheel apparatus 70I, 70J.

Fourth Embodiment

A projection-type image display apparatus according to a fourth embodiment will hereinafter be described with reference to FIGS. 21 to 22. In the following description, differences from the projection-type image display apparatus according to the second embodiment will mainly be described. Portions having the same configurations as the second embodiment will be denoted by the same reference numerals and will not repeatedly be described in detail.

(Overview of Projection-Type Image Display Apparatus)

Figure 21:
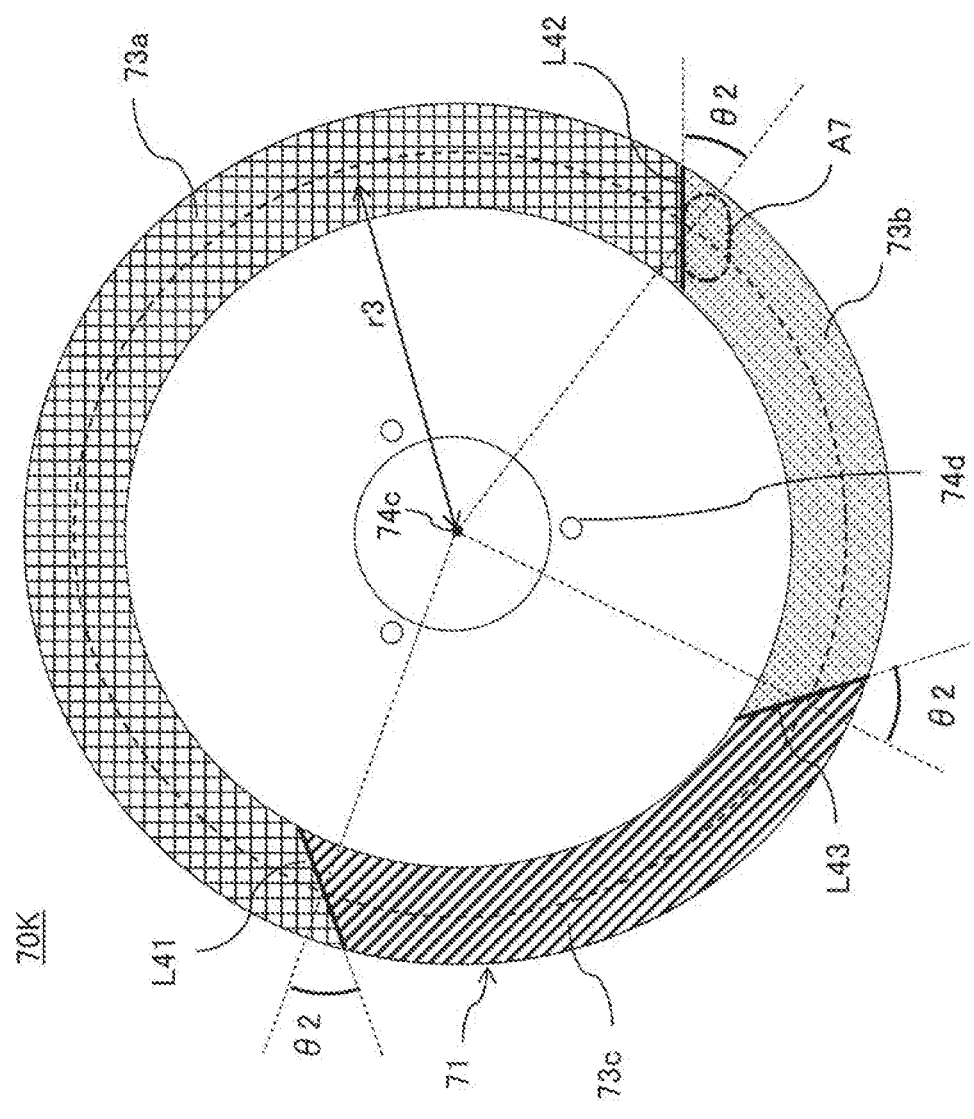
FIG. 21 is a plan view showing a configuration of a phosphor wheel apparatus 70K according to a fourth embodiment.

FIG. 21 is a plan view showing a configuration of a phosphor wheel apparatus 70K according to the fourth embodiment. FIG. 22 is a plan view showing a configuration of a color filter wheel apparatus 80K according to the fourth embodiment. The projection-type image display apparatus according to the fourth embodiment includes the wheel apparatus 70K and the color filter wheel apparatus 80K instead of the wheel apparatus 70E and the color filter wheel apparatus 80 of FIG. 10.

The second embodiment is intended to reduce or minimize the influence of the spoke loss occurring at the boundary lines of the regions of the dichroic filters 82a to 82c and the transmission window 82d (second optical elements). On the other hand, the fourth embodiment is intended to additionally or alternatively reduce or minimize the influence of the spoke loss occurring at the boundary lines of the regions of the phosphors 73a, 73b and the diffusion film 73c (first optical elements).

(Configuration of Phosphor Wheel Apparatus 70K)

The phosphor wheel apparatus 70K includes the substrate 71, the dichroic filter 72 (not shown), the phosphors 73a and 73b, the diffusion film 73c, and the driving device 74.

The phosphor wheel apparatus 70K includes a plurality of the first optical elements that are respectively formed in a plurality of different regions along the circumference having the radius r3 from the rotation axis 74c on the substrate 71 and that have wavelength characteristics different from each other. The plurality of the first optical elements is a plurality of phosphors, or a combination of at least one phosphor and an element generating an outgoing light having the same wavelength characteristic as the wavelength characteristic of the incident light. In the example of FIG. 21, the first optical element is a combination of the phosphors 73a and 73b and the diffusion film 73c that is an element generating an outgoing light having the same wavelength characteristic as the wavelength characteristic of the incident light.

The optical axis of the incident light to the phosphors 73a, 73b and the diffusion film 73c passes through the circumference having the radius r3 from the rotation axis 74c in the phosphor wheel apparatus 70K. The regions of the phosphors 73a, 73b and the diffusion film 73c are formed to include respective different arc portions of the circumference having the radius r3 from the rotation axis 74c. The regions of the phosphors 73a, 73b and the diffusion film 73c are adjacent to each other via boundary lines including linear sections L41 to L43. The linear sections L41 to L43 of the boundary lines intersect with respective straight lines along the radius of the substrate 71 at the same intersection angle θ2 greater than 0 degrees and less than 90 degrees.

The light incident on the phosphors 73a, 73b and the diffusion film 73c from the optical system (the lens 30 and the diffusion plate 60) of the stage preceding the wheel apparatus 70K forms a spot region A7 as shown in FIG. 21.

In other respects, the phosphor wheel apparatus 70K of FIG. 21 is configured similarly to the phosphor wheel apparatus 70E of FIGS. 11 and 12.

(Configuration of Color Filter Wheel Apparatus 80K)

The color filter wheel apparatus 80K includes the substrate 81, the dichroic filters 82a to 82c, the transmission window 82d, the antireflection film 83 (not shown), and the driving device 84.

The wheel apparatus 80K includes at least one second optical element formed on the circumference having the radius r4 from the rotation axis 74c on the substrate 81. The second optical element includes at least one color filter. In the example of FIG. 22, the second optical element is a combination of dichroic filters 82a to 82c that are a plurality of color filters and a transmission window 82d that is an element generating an outgoing light having the same wavelength characteristic as the wavelength characteristic of the incident light.

The optical axis of the incident light onto the dichroic filters 82a to 82c and the transmission window 82d passes through the circumference having the radius r4 from the rotation axis 74c in the color filter wheel apparatus 80K. The regions of the dichroic filters 82a to 82c and the transmission window 82d are formed to include respective different arc portions of the circumference having the radius r4 from the rotation axis 74c. In the example of FIG. 22, the regions of the dichroic filters 82a to 82c and the transmission window 82d are each formed into a fan shape.

Figure 22:
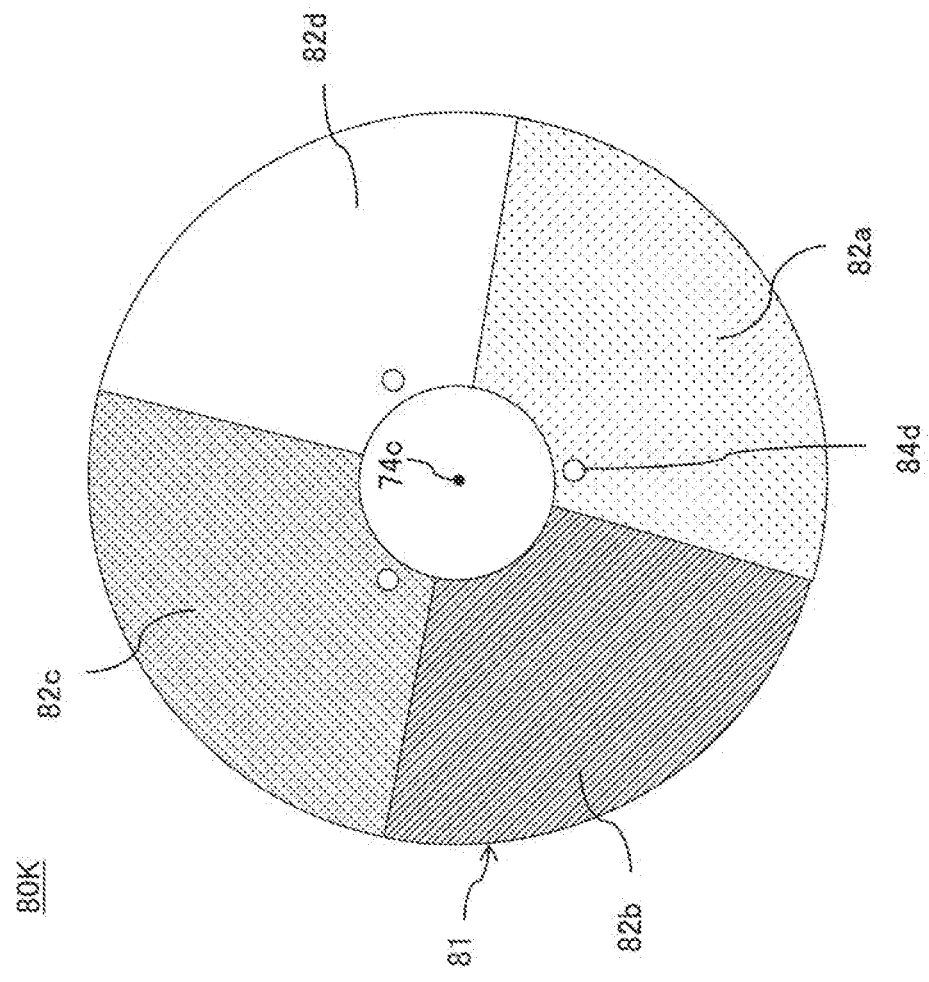
FIG. 22 is a plan view showing a configuration of a color filter wheel apparatus 80K according to the fourth embodiment.

In other respects, the color filter wheel apparatus 80K of FIG. 22 is configured similarly to the color filter wheel apparatus 80 of FIGS. 13 and 14.

(Reduction of Spoke Loss)

To reduce the influence of the spoke loss, the regions of the phosphors 73a, 73b and the diffusion film 73c are formed such that the time of the spokes passing over the spot region A7 is reduced or minimized when the substrate 71 rotates. Therefore, the phosphor wheel apparatus 70K is disposed relative to the optical system of the stage preceding the phosphor wheel apparatus 70K such that when the surface of the phosphor wheel apparatus 70K at a predetermined rotational position is viewed along the optical axis, the spot region A7 overlaps with one of the multiple linear sections L41 to L43 and this linear section becomes parallel to the longitudinal direction of the spot region. The example of FIG. 21 shows the case that the linear section L42 is parallel to the longitudinal direction of the spot region A7 when an edge of the spot region A7 overlaps with the linear section L42. By arranging the phosphor wheel apparatus 70K and the optical system of the preceding stage in this way, the influence of the spoke loss can be reduced or minimized.

The phosphor wheel apparatus 70K may be disposed relative to the optical system of the stage preceding the wheel apparatus 70I such that when the spot region A7 overlaps with one of the multiple linear sections L41 to L43 at another position (e.g., the center), this linear section becomes parallel to the longitudinal direction of the spot region A7.

The spot region A7 is not limited to a rectangular shape, or a rectangular shape with rounded corners, and may have other shapes such as an ellipse as long as the region has longitudinal and lateral lengths different from each other (i.e., has a longitudinal direction).

As described above, the linear sections L21 to L24 intersect with the respective straight lines along the radius of the substrate 71 at the same intersection angle θ2. Therefore, the influence of the spoke loss can be reduced or minimized when the spot region A7 passes over any boundary line among the boundary lines of the regions of the phosphors 73a, 73b and the diffusion film 73c.

(Effects of Fourth Embodiment)

According to the wheel apparatus 70K of this embodiment, by forming the boundary lines of the regions of the phosphors 73a, 73b and the diffusion film 73c and arranging the wheel apparatus 70K and the optical system of the preceding stage as shown in FIG. 21, the influence of the spoke loss can be reduced or minimized. As a result, the light source apparatus and the projection-type image display apparatus including the wheel apparatus 70K according to this embodiment can improve the luminance of the image light as compared to the conventional techniques.

(Modification of Fourth Embodiment)

The color filter wheel apparatus 80 according to the second embodiment may be combined with the phosphor wheel apparatus 70K according to the fourth embodiment. Therefore, the projection-type image display apparatus 100E of FIG. 10 may include the phosphor wheel apparatus 70K of FIG. 21 instead of the phosphor wheel apparatus 70E. As a result, the influence of the spoke loss can be reduced or minimized at both the boundary lines of the regions of the phosphors 73a, 73b and the diffusion film 73c and the boundary lines of the regions of the dichroic filters 82a to 82c and the transmission window 82d.

(Summary of Fourth Embodiment)

In the fourth embodiment, the phosphor wheel apparatus 70K is also referred to as "first wheel apparatus" or simply "wheel apparatus", and the color filter wheel apparatus 80K is also referred to as "second wheel apparatus".

The wheel apparatus, the light source apparatus, and the projection-type image display apparatus according to the fourth embodiment have the following configurations.

According to the wheel apparatus according to the fourth embodiment, the phosphor wheel apparatus 70K includes the substrate 71 rotatable around the rotation axis 74c and a plurality of the optical elements respectively formed in a plurality of regions different from each other around the rotation axis 74c on the substrate 71 and having wavelength characteristics different from each other. The regions of the plurality of the optical elements are adjacent to each other via boundary lines including linear sections L41 to L43. The linear sections L41 to L43 of the boundary lines intersect with respective straight lines along the radius of the substrate 71 at the same intersection angle θ2 greater than 0 degrees and less than 90 degrees. The plurality of the optical elements is a plurality of phosphors, or a combination of at least one phosphor and an element generating an outgoing light having the same wavelength characteristic as the wavelength characteristic of the incident light.

As a result, by forming the boundary lines of the regions of the phosphors 73a, 73b and the diffusion film 73c as described above and arranging the phosphor wheel apparatus 70K and other lenses etc. as described above, the influence of the spoke loss can be reduced or minimized.

According to the light source apparatus of the fourth embodiment, the light source apparatus includes the phosphor wheel apparatus 70K, the driving device 74, the color filter wheel apparatus 80K, the driving device 84, the light source element 21 generating the source light, the first optical system, and the second optical system. The color filter wheel apparatus 80K includes the substrate 81 rotatable around the rotation axis 74c, and the at least one second optical element is formed on the substrate 81. The second optical element includes at least one color filter. The driving device 74 rotates the substrate 71 of the phosphor wheel apparatus 70K. The driving device 84 rotates the substrate 81 of the color filter wheel apparatus 80K.

As a result, the influence of the spoke loss can be reduced or minimized in the light source apparatus including the phosphor wheel apparatus 70K.

According to the light source apparatus of the fourth embodiment, the light source apparatus includes the phosphor wheel apparatus 70K, the driving device 74, the color filter wheel apparatus 80, the driving device 84, and the light source element 21 that generating the source light, the first optical system, and the second optical system.

As a result, by forming the boundary lines of the phosphors 73a, 73b and the diffusion film 73c as described above, forming the boundary lines of the regions of the dichroic filters 82a to 82c and the transmission window 82d as described above, and arranging the phosphor wheel apparatus 70K, the color filter wheel apparatus 80, and other lenses etc. as described above, the influence of the spoke loss can be reduced or minimized.

According to the light source apparatus of the fourth embodiment, the phosphor wheel apparatus 70K may be disposed relative to the first optical system such that when the surface of the phosphor wheel apparatus 70K at a predetermined rotational position is viewed along the optical axis, the spot region of the incident light onto the optical elements of the phosphor wheel apparatus 70K from the first optical system overlaps with one of the multiple linear sections L41 to L43 and the one of the linear sections L41 to L43 becomes parallel to the longitudinal direction of the spot region.

As a result, the influence of the spoke loss can be reduced or minimized by arranging the phosphor wheel apparatus 70K and the optical system of the preceding stage as described above.

According to the light source apparatus of the fourth embodiment, the color filter wheel apparatus 80 may be disposed relative to the second optical system such that when the surface of the color filter wheel apparatus 80 at a predetermined rotational position is viewed along the optical axis, the spot region of the incident light from the second optical system to the optical element of the color filter wheel apparatus 80 overlaps with one of the multiple linear sections L21 to L24 and the one of the linear sections L21 to L24 becomes parallel to the longitudinal direction of the spot region.

As a result, the influence of the spoke loss can be reduced or minimized by arranging the color filter wheel apparatus 80 and the optical system of the preceding stage as described above.

According to the light source apparatus of the fourth embodiment, the second optical system may include the rod integrator 34 having a quadrilateral cross-sectional shape. The color filter wheel apparatus 80 is disposed relative to the rod integrator 34 such that when the surface of the color filter wheel apparatus 80 at a predetermined rotational position is viewed along the optical axis, the spot region of the incident light from the rod integrator 34 to the color filter wheel apparatus 80 overlaps with one of the multiple linear sections L21 to L24 and the one of the linear sections L21 to L24 becomes parallel to the longest one of the four sides of the cross section of the rod integrator 34.

As a result, the influence of the spoke loss can be reduced or minimized by arranging the color filter wheel apparatus 80 and the optical system of the preceding stage as described above.

According to the projection-type image display apparatus of the fourth embodiment, the projection-type image display apparatus includes a light source apparatus including the phosphor wheel apparatus 70K and an optical modulation element spatially modulating the outgoing light of the optical element of the phosphor wheel apparatus 70K.

As a result, the influence of the spoke loss can be reduced or minimized in the projection-type image display apparatus including the phosphor wheel apparatus 70K.

Fifth Embodiment

A projection-type image display apparatus according to a fifth embodiment will hereinafter be described with reference to FIGS. 23 to 25. In the following description, differences from the projection-type image display apparatus according to the second embodiment will mainly be described. Portions having the same configurations as the second embodiment will be denoted by the same reference numerals and will not repeatedly be described in detail.

(Overview of Projection-Type Image Display Apparatus 100L)

Figure 23:
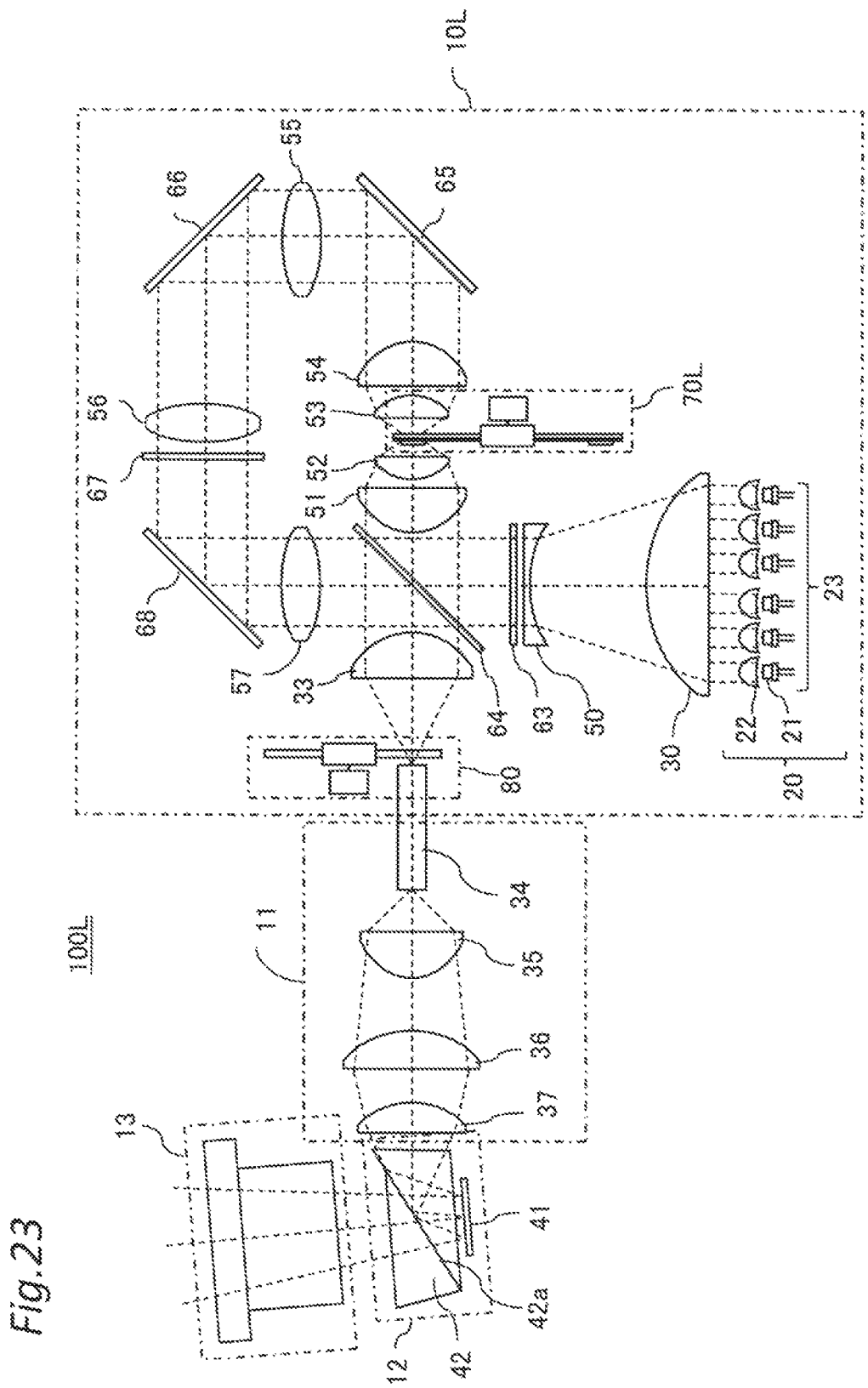
FIG. 23 is a schematic diagram showing a configuration of a projection-type image display apparatus 100L according to a fifth embodiment.

FIG. 23 is a schematic diagram showing a configuration of a projection-type image display apparatus 100L according to the fifth embodiment. The projection-type image display apparatus 100L includes a light source apparatus 10L instead of the light source apparatus 10E of FIG. 10. The light source apparatus 10L includes a phosphor wheel apparatus 70L instead of the phosphor wheel apparatus 70E of FIG. 10. The phosphor wheel apparatus 70L includes a substrate 71L made of a reflective material instead of the substrate 71 made of a transparent material. The substrate 71L includes an opening 73d directly transmitting an incident light, instead of forming the diffusion film 73c thereon.

In the case of the second embodiment, the substrate 71 is made of a transparent material, and the outgoing light of the phosphors 73a, 73b and the diffusion film 73c has the same direction as the direction of the incident light to the phosphors 73a, 73b and the diffusion film 73c. On the other hand, in the case of the fifth embodiment, the substrate 71L is made of a reflective material having high light resistance and reflecting light, such as metal, and the outgoing light from the phosphors 73a, 73b and the diffusion film 73c has the direction opposite to the direction of the incident light to the phosphors 73a, 73b and the diffused film 73c. This is a configuration for increasing a light intensity of source light and making a luminance of projection light higher as compared to the second embodiment.

(Configuration of Light Source Apparatus 10L)

The light source apparatus 10L includes the light source 20, the phosphor wheel apparatus 70L, the color filter wheel apparatus 80, the condenser lens 30, lenses 30, 51 to 57, a diffusion plate 63, a dichroic mirror 64, mirrors 65, 66, 68, and a diffusion plate 67. The dichroic mirror 64 reflects the incident light having the wavelength of the source light and transmits the incident light having the wavelength of the fluorescence.

The source light emitted from the light source 20 is made incident on the dichroic mirror 64 via the condenser lens 30, the lens 50, and the diffusion plate 63. Subsequently, the source light is reflected by the dichroic mirror 64 and made incident on the phosphor wheel apparatus 70L via the lenses 51 and 52.

The phosphor wheel apparatus 70L includes a phosphor excited by the incident source light to generate a fluorescence having a wavelength different from the wavelength of the source light. The phosphor wheel apparatus 70L further includes an opening formed in a region different from the region of the phosphor and allowing passage of the incident source light. Details of the phosphor wheel apparatus 70L will be described later.

The fluorescence emitted from the phosphor of the phosphor wheel apparatus 70E is reflected by the substrate 71L and made incident on the dichroic mirror 64 via the lenses 51 and 51. Subsequently, the fluorescence is transmitted through the dichroic mirror 64 and made incident on the color filter wheel apparatus 80 via the lens 33.

On the other hand, the source light passing through the opening 73d of the phosphor wheel apparatus 70L is made incident on the diffusion plate 67 via the lens 53, the lens 54, the mirror 65, the lens 55, the mirror 66, and the lens 56. As with the diffusion film 73c of the second embodiment, the diffusion plate 67 diffuses the source light. The source light diffused by the diffusion plate 67 is made incident on the dichroic mirror 64 via the mirror 68 and the lens 57, reflected by the dichroic mirror 64, and then made incident on the color filter wheel apparatus 80 via the lens 33.

The color filter wheel apparatus 80, the illumination optical system 11, the modulation device 12, and the projection optical system 13 of FIG. 23 are configured similarly to the corresponding constituent elements of FIG. 10 and operate in the same way.

(Configuration of Phosphor Wheel Apparatus 70L)

A configuration of the phosphor wheel apparatus 70L will be described with reference to FIGS. 24 and 25. FIG. 24 is a side view showing the configuration of the wheel apparatus 70L of FIG. 23. FIG. 25 is a plan view showing the configuration of the wheel apparatus 70L of FIG. 23. FIG. 24 cross-sectional view when the phosphor wheel apparatus 70L is viewed in the same direction as FIG. 23. FIG. 25 shows a plan view when the phosphor wheel apparatus 70L is viewed from the left side of FIG. 23.

The phosphor wheel apparatus 70L includes the substrate 71L, the phosphors 73a and 73b, the opening 73d, and the driving device 74. The phosphor wheel apparatus 70L has a configuration in which the substrate 71 of the wheel apparatus 70E of FIGS. 11 and 12 is replaced with the substrate 71L while the dichroic filter 72 and the diffusion film 73c are removed.

The substrate 71L is made of a reflective material and includes the opening 73d in a region corresponding to the diffusion film 73c of FIG. 12. As with the substrate 71, the substrate 71L is rotatable around the rotation axis 74c. The substrate 71L has a disk shape, for example. The substrate 71L is an aluminum substrate having high reflectivity over the entire visible light range, for example.

Figure 24:
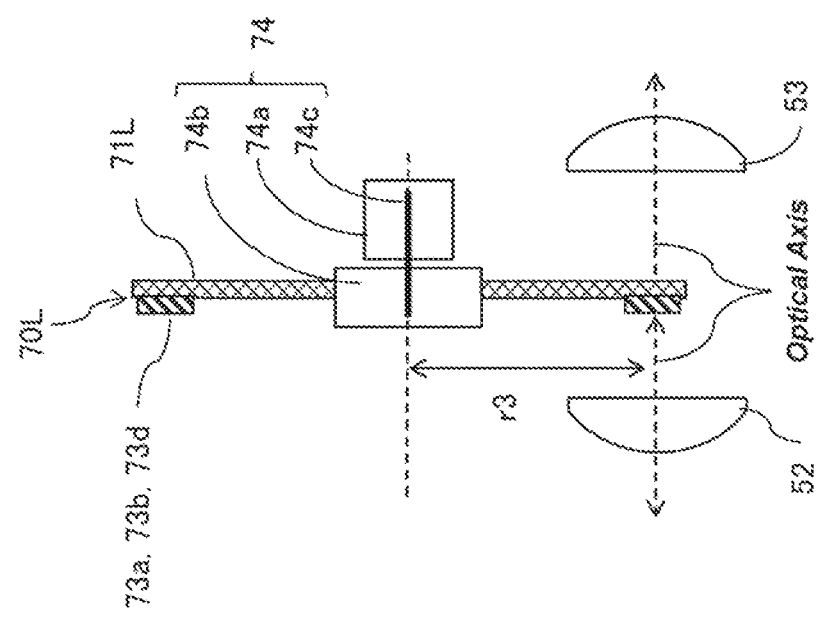
FIG. 24 is a side view showing a configuration of a wheel apparatus 70L of FIG. 23.

The phosphors 73a and 73b may be formed directly on the substrate 71L as shown in FIG. 24 or may be formed via a reflective layer so as to enhance reflectivity. The reflective layer is made of a mixture of titanium oxide and a binder, for example.

The phosphor wheel apparatus 70L includes a plurality of the first optical elements that are respectively formed in a plurality of different regions along the circumference having the radius r3 from the rotation axis 74c on the substrate 71L and that have wavelength characteristics different from each other. The plurality of the first optical elements is a plurality of phosphors, or a combination of at least one phosphor and an element generating an outgoing light having the same wavelength characteristic as the wavelength characteristic of the incident light. In the example of FIG. 25, the first optical elements are a combination of the phosphors 73a and 73b and the opening 73d that is an element generating an outgoing light having the same wavelength characteristic as the wavelength characteristic of the incident light.

The optical axis of the incident light to the phosphors 73a, 73b and the opening 73d passes through the circumference having the radius r3 from the rotation axis 74c in the phosphor wheel apparatus 70L. The regions of the phosphors 73a, 73b and the opening 73d are formed to include respective different arc portions of the circumference having the radius r3 from the rotation axis 74c. The regions of the phosphors 73a, 73b and the opening 73d are adjacent to each other via boundary lines including linear sections L51 to L53. The linear sections L51 to L53 of the boundary lines intersect with respective straight lines along the radius of the substrate 71 at the same intersection angle greater than 0 degrees and less than 90 degrees.

The light incident on the phosphors 73a, 73b and the opening 73d from the optical system (the lens 51 and 52) of the stage preceding the wheel apparatus 70L forms a spot region A8 as shown in FIG. 21.

In other respects, the phosphor wheel apparatus 70L of FIGS. 24 and 25 is configured similarly to the phosphor wheel apparatus 70K of FIG. 21.

(Reduction of Spoke Loss)

To reduce the influence of the spoke loss, the regions of the phosphors 73a, 73b and the opening 73d are formed such that the time of the spokes passing over the spot region A8 is reduced or minimized when the substrate 71L rotates. Therefore, the phosphor wheel apparatus 70L is disposed relative to the optical system of the stage preceding the phosphor wheel apparatus 70L such that when the surface of the phosphor wheel apparatus 70L at a predetermined rotational position is viewed along the optical axis, the spot region A8 overlaps with one of the multiple boundary lines L51 to L53 and this linear section becomes parallel to a longitudinal direction of the spot region A8. The example of FIG. 25 shows the case that the boundary line L52 is parallel to the longitudinal direction of the spot region A8 when an edge of the spot region A8 overlaps with the boundary line L52. By arranging the phosphor wheel apparatus 70L and the optical system of the preceding stage in this way, the influence of the spoke loss can be reduced or minimized.

The phosphor wheel apparatus 70L may be disposed relative to the optical system of the stage preceding the phosphor wheel apparatus 70L such that when the spot region A8 overlaps with one of the multiple boundary lines L51 to L53 at another position (e.g., the center), this linear section becomes parallel to the longitudinal direction of the spot region A8.

The spot region A8 is not limited to a rectangular shape, or a rectangular shape with rounded corners, and may have other shapes such as an ellipse as long as the region has longitudinal and lateral lengths different from each other (i.e., has a longitudinal direction).

As described above, the boundary lines L51 to L53 intersect with the respective straight lines along the radius of the substrate 71L at the same intersection angle θ2. Therefore, the influence of the spoke loss can be reduced or minimized when the spot region A8 passes over any boundary line among the boundary lines of the regions of the phosphors 73a, 73b and the opening 73d.

(Effect of Fifth Embodiment)

According to the phosphor wheel apparatus 70L of this embodiment, by forming the boundary lines of the regions of the phosphors 73a, 73b and the opening 73d and arranging the phosphor wheel apparatus 70L and the optical system of the preceding stage as shown in FIG. 25, the influence of the spoke loss can be reduced or minimized. As a result, the light source apparatus 10L and the projection-type image display apparatus 100L including the phosphor wheel apparatus 70L according to this embodiment can improve the luminance of the image light as compared to the conventional techniques.

Other Modifications

The aspects of the present disclosure are also applicable to a light source apparatus and a projection-type image display apparatus including only one wheel apparatus and in which only one of phosphors and color filters is formed on the wheel apparatus. Alternatively, the aspects of the present disclosure are also applicable to a light source apparatus and a projection-type image display apparatus including a wheel apparatus provided with a plurality of optical elements different from phosphors and color filters and generating an outgoing light in wavelength ranges different from each other in accordance with the same incident light.

The wheel apparatus according to the embodiment of the present disclosure is also applicable to a projection-type image display apparatus including a liquid crystal element as an optical modulation element, instead of the DMD.

The wheel apparatus according to the aspects of the present disclosure is applicable to a light source apparatus and a projection-type image display apparatus.

The light source apparatus of the projection-type image display apparatus has been described as an example of the present disclosure; however, the light source apparatus according to the aspects of the present disclosure is not limited thereto and may be an illumination device such as a headlamp, for example.

As described above, the first to fifth embodiments have been described as examples of the technique disclosed in the present application. However, the technique in the present disclosure is not limited thereto and is also be applicable to embodiments in which changes, substitutions, additions, omissions, etc. are made. Additionally, the constituent elements described above can be combined to provide a new embodiment.

What is claimed is:

1. A wheel apparatus comprising:
a substrate rotatable around a rotation axis;
a plurality of optical elements respectively formed in a plurality of regions different from each other around the rotation axis on the substrate and having wavelength characteristics different from each other,
the regions of the plurality of optical elements being adjacent to each other via boundary lines including linear sections, and the linear sections of the boundary lines intersecting with respective straight lines along the radius of the substrate at a same intersection angle greater than 0 degrees and less than 90 degrees;
a driving device rotating the substrate of the wheel apparatus;
a light source element generating a source light; and
an optical system guiding the source light generated by the light source element as an incident light to the optical elements of the wheel apparatus,
wherein the wheel apparatus is disposed relative to the optical system such that when a surface of the wheel apparatus at a predetermined rotational position is viewed along an optical axis, a spot region of the incident light from the optical system to the optical elements overlaps with one of the multiple linear sections and the one of the linear sections becomes parallel to a longitudinal direction of the spot region.

2. The wheel apparatus according to claim 1, wherein the plurality of optical elements is
(1) a plurality of phosphors, or
(2) a combination of at least one phosphor and an element generating an outgoing light having a same wavelength characteristic as a wavelength characteristic of an incident light.

3. The wheel apparatus according to claim 1, wherein the plurality of optical elements is
(1) a plurality of color filters, or
(2) a combination of at least one color filter and an element generating an outgoing light having a same wavelength characteristic as a wavelength characteristic of an incident light.

4. A projection-type image display apparatus comprising:
the light source apparatus according to claim 1; and
an optical modulation element spatially modulating an outgoing light of the optical elements of the light source apparatus.

5. A light source apparatus comprising:
a first wheel apparatus including a first substrate rotatable around a first rotation axis, the first wheel apparatus having a plurality of first optical elements formed on the first substrate;
a first driving device rotating the first substrate;
a second wheel apparatus including a second substrate rotatable around a second rotation axis, the second wheel apparatus having at least one second optical element formed on the second substrate;
a second driving device rotating the second substrate;
a light source element generating a source light;
a first optical system guiding the source light generated by the light source element as an incident light to the first optical elements; and
a second optical system guiding an outgoing light of the first optical elements as an incident light to the second optical element, wherein
the first wheel apparatus further comprises:
a substrate rotatable around a rotation axis; and
a plurality of optical elements respectively formed in a plurality of regions different from each other around the rotation axis on the substrate and having wavelength characteristics different from each other,
the regions of the plurality of optical elements being adjacent to each other via boundary lines including linear sections, and the linear sections of the boundary lines intersecting with respective straight lines along the radius of the substrate at a same intersection angle greater than 0 degrees and less than 90 degrees, and the second optical element includes at least one color filter, and wherein
the plurality of optical elements is
(1) a plurality of phosphors, or
(2) a combination of at least one phosphor and an element generating an outgoing light having a same wavelength characteristic as a wavelength characteristic of an incident light.

6. The light source apparatus according to claim 5, wherein
the first wheel apparatus is disposed relative to the first optical system such that when a surface of the first wheel apparatus at a predetermined rotational position is viewed along an optical axis, a spot region of the incident light from the first optical system to the optical elements of the first wheel apparatus overlaps with one of the multiple linear sections and the one of the linear sections becomes parallel to a longitudinal direction of the spot region.

7. A projection-type image display apparatus comprising:
the light source apparatus according to claim 5; and
an optical modulation element spatially modulating an outgoing light of the optical elements of the second wheel apparatus of the light source apparatus.

8. A light source apparatus comprising:
a first wheel apparatus including a first substrate rotatable around a first rotation axis, the first wheel apparatus having at least one first optical element formed on the first substrate;
a first driving device rotating the first substrate;
a second wheel apparatus including a second substrate rotatable around a second rotation axis, the second wheel apparatus having a plurality of second optical elements formed on the second substrate;
a second driving device rotating the second substrate;
a light source element generating a source light;
a first optical system guiding the source light generated by the light source element as an incident light to the first optical element; and
a second optical system guiding an outgoing light of the first optical element as an incident light to the second optical elements, wherein
the first optical element includes at least one phosphor, and the second wheel apparatus further comprises:
a substrate rotatable around a rotation axis; and
a plurality of optical elements respectively formed in a plurality of regions different from each other around the rotation axis on the substrate and having wavelength characteristics different from each other,
the regions of the plurality of optical elements being adjacent to each other via boundary lines including linear sections, and the linear sections of the boundary lines intersecting with respective straight lines along the radius of the substrate at a same intersection angle greater than 0 degrees and less than 90 degrees, and wherein
the plurality of optical elements is
(1) a plurality of color filters, or
(2) a combination of at least one color filter and an element generating an outgoing light having a same wavelength characteristic as a wavelength characteristic of an incident light.

9. The light source apparatus according to claim 8, wherein
the second wheel apparatus is disposed relative to the second optical system such that when a surface of the second wheel apparatus at a predetermined rotational position is viewed along an optical axis, a spot region of the incident light from the second optical system to the optical elements of the second wheel apparatus overlaps with one of the multiple linear sections and the one of the linear sections becomes parallel to a longitudinal direction of the spot region.

10. The light source apparatus according to claim 9, wherein
the second optical system includes a rod integrator having a quadrilateral cross-sectional shape, and
the second wheel apparatus is disposed relative to the rod integrator such that when a surface of the second wheel apparatus at a predetermined rotational position is viewed along an optical axis, a spot region of the incident light from the rod integrator to the optical elements of the second wheel apparatus overlaps with one of the multiple linear sections and the one of the linear sections becomes parallel to a longest one of four sides of a cross section of the rod integrator.

11. A wheel apparatus comprising:
a substrate rotatable around a rotation axis;
a plurality of first optical elements respectively formed in a plurality of regions different from each other along a first circumference having a first radius from the rotation axis on the substrate; and
at least one second optical element formed on a second circumference having a second radius different from the first radius from the rotation axis on the substrate, wherein
the plurality of first optical elements is
(1) a plurality of phosphors, or
(2) a combination of at least one phosphor and an element generating an outgoing light having a same wavelength characteristic as a wavelength characteristic of an incident light,
the second optical element includes at least one color filter,
the regions of the plurality of first optical elements are adjacent to each other via boundary lines including first linear sections, and
the first linear sections intersect with respective straight lines along the radius of the substrate at a same intersection angle greater than 0 degrees and less than 90 degrees.

12. A wheel apparatus comprising:
a substrate rotatable around a rotation axis;
at least one first optical element formed on a first circumference having a first radius from the rotation axis on the substrate; and
a plurality of second optical elements respectively formed in a plurality of regions different from each other along a second circumference having a second radius different from the first radius from the rotation axis on the substrate, wherein
the first optical element includes at least one phosphor, wherein
the plurality of second optical elements is
(1) a plurality of color filters, or
(2) a combination of at least one color filter and an element generating an outgoing light having a same wavelength characteristic as a wavelength characteristic of an incident light, wherein
the regions of the plurality of second optical elements are adjacent to each other via boundary lines including second linear sections, and wherein
the second linear sections intersect with respective straight lines along the radius of the substrate at a same intersection angle greater than 0 degrees and less than 90 degrees.

13. A light source apparatus comprising:
the wheel apparatus according to claim 12;
a driving device rotating the substrate of the wheel apparatus;
a light source element generating a source light;
a first optical system guiding the source light generated by the light source element as an incident light to the first optical elements; and
a second optical system guiding an outgoing light of the first optical elements as an incident light to the second optical elements.

14. The light source apparatus according to claim 13, wherein
the wheel apparatus is disposed relative to the first optical system such that when a surface of the wheel apparatus at a predetermined rotational position is viewed along an optical axis, a spot region of the incident light from the first optical system to the first optical elements overlaps with one of the multiple first linear sections and the one of the first linear sections becomes parallel to a longitudinal direction of the spot region.

15. The light source apparatus according to claim 13, wherein
the wheel apparatus is disposed relative to the second optical system such that when a surface of the wheel apparatus at a predetermined rotational position is viewed along an optical axis, a spot region of the incident light from the second optical system to the second optical elements overlaps with one of the multiple second linear sections and the one of the second linear sections becomes parallel to a longitudinal direction of the spot region.

16. The light source apparatus according to claim 15, wherein
the second optical system includes a rod integrator having a quadrilateral cross-sectional shape, and
the wheel apparatus is disposed relative to the rod integrator such that when a surface of the wheel apparatus at a predetermined rotational position is viewed along an optical axis, a spot region of the incident light from the rod integrator to the optical elements overlaps with one of the multiple linear sections and the one of the linear sections becomes parallel to a longest one of four sides of a cross section of the rod integrator.

17. A projection-type image display apparatus comprising:
the light source apparatus according to claim 13; and
an optical modulation element spatially modulating an outgoing light of the second optical elements of the light source apparatus.

* * * * *